May 7, 1968     C. G. CLARK ETAL     3,381,792
CONVEYING APPARATUS
Filed June 22, 1966     13 Sheets-Sheet 2
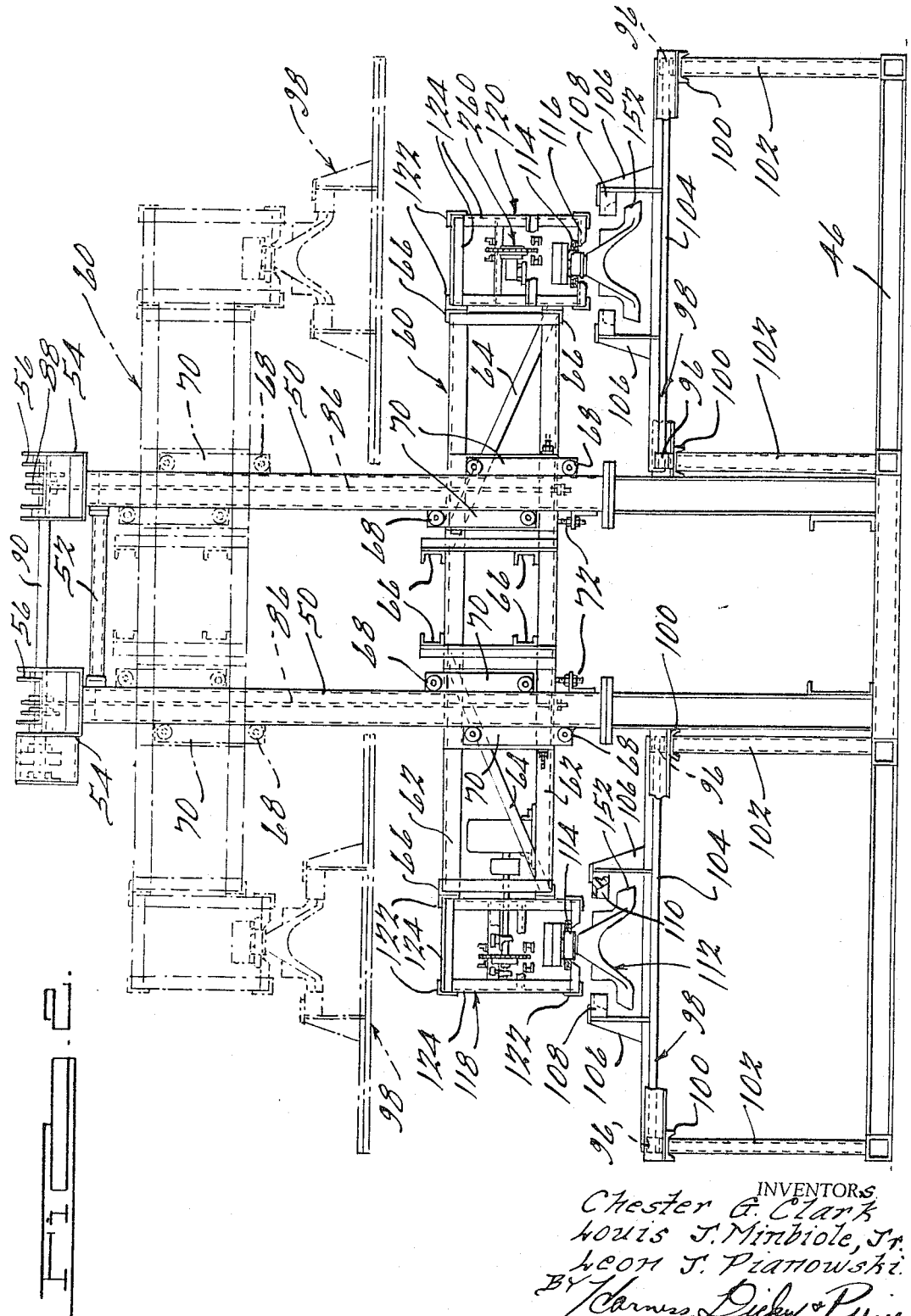
INVENTORS
Chester G. Clark
Louis J. Minbiole, Jr.
Leon J. Pianowski
BY Harness, Dickey & Pierce
ATTORNEYS

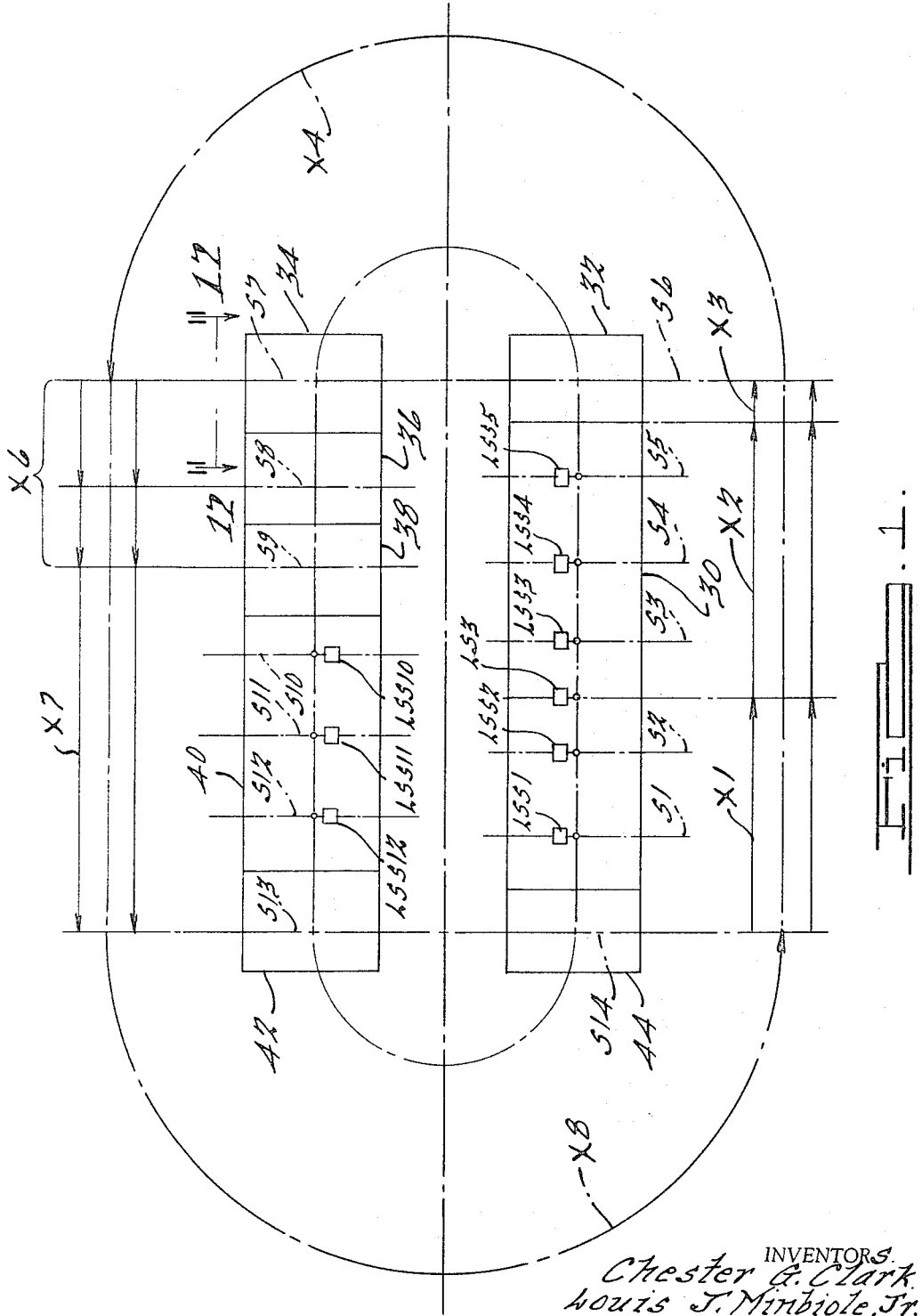

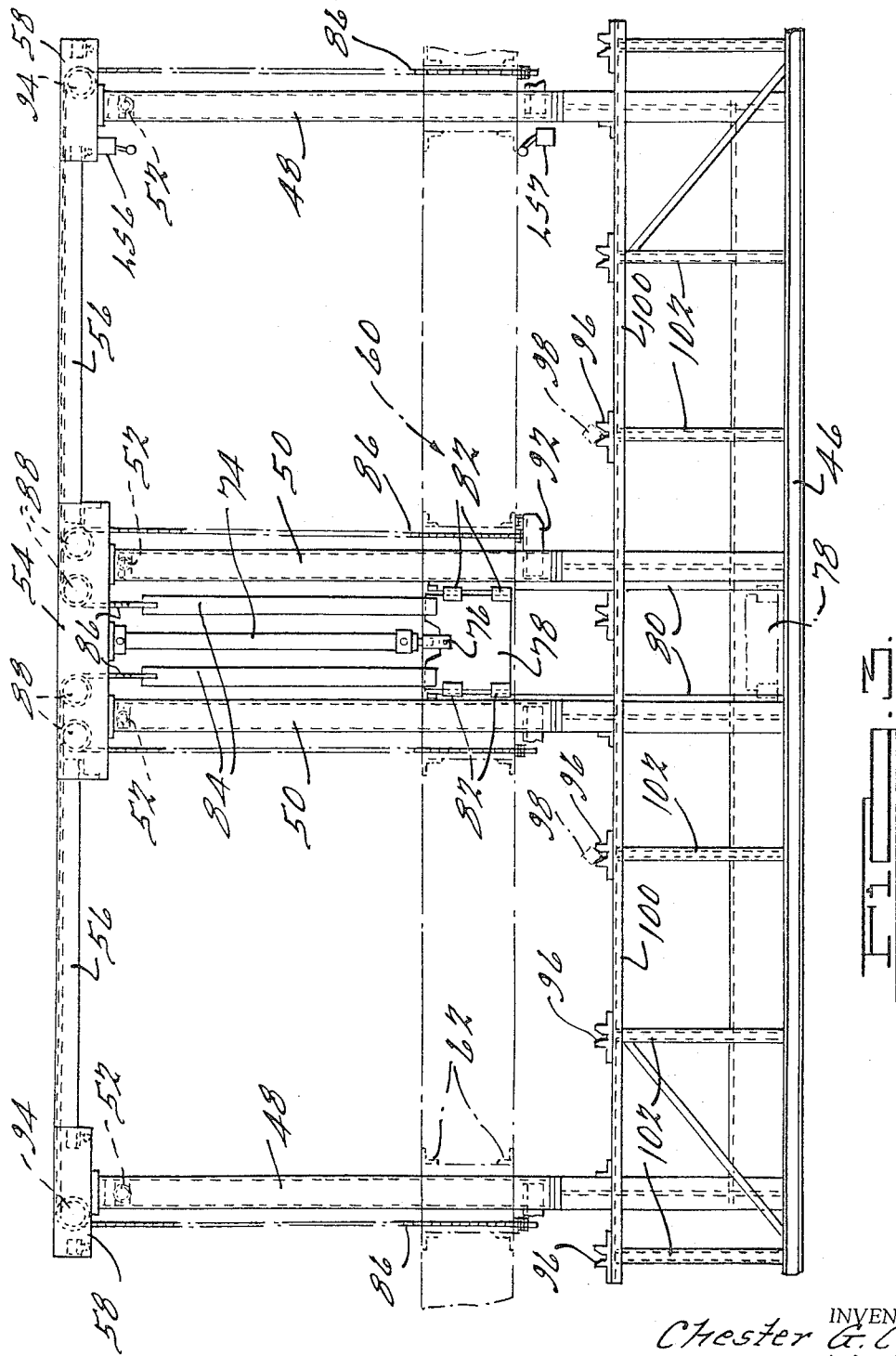

May 7, 1968  C. G. CLARK ETAL  3,381,792
CONVEYING APPARATUS
Filed June 22, 1966  13 Sheets-Sheet 4
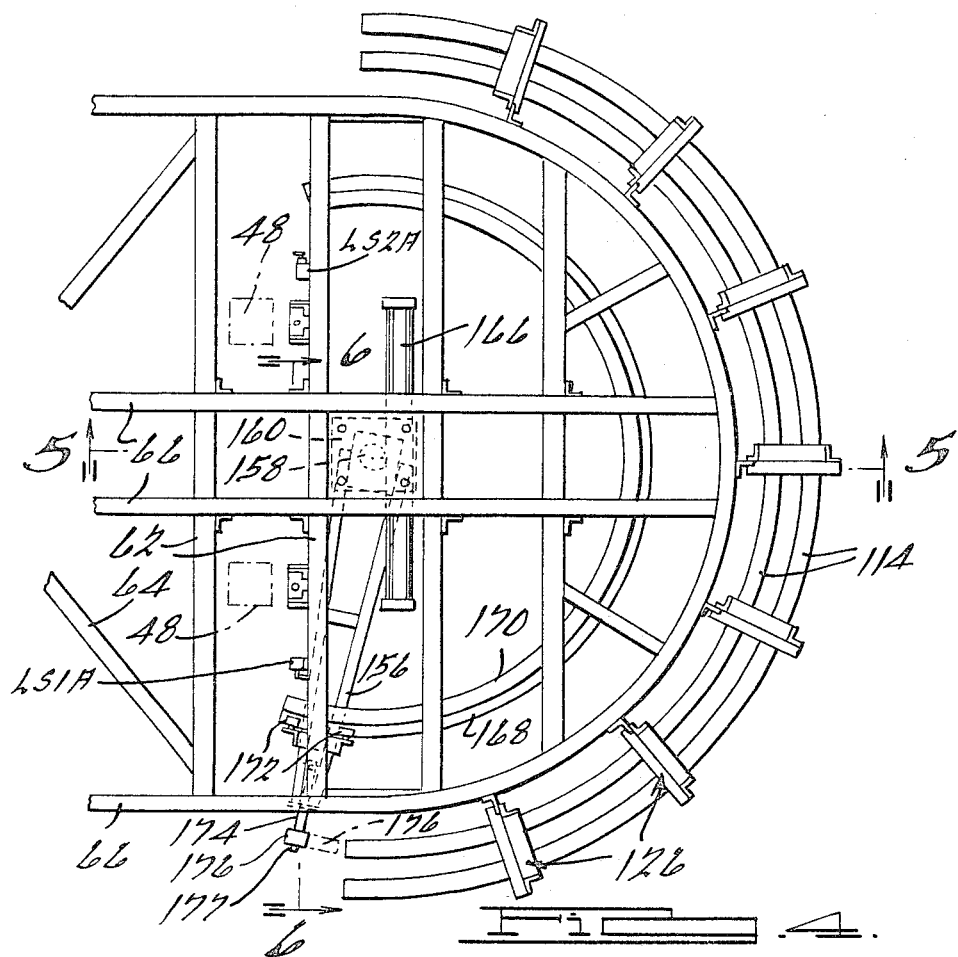
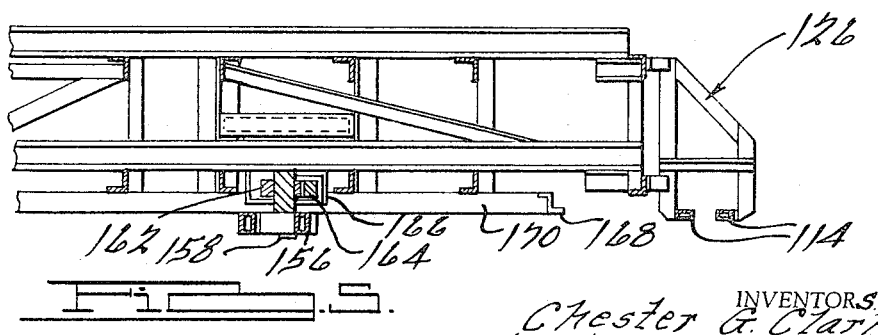
INVENTORS
Chester G. Clark
Louis J. Minbiole, Jr.
Leon J. Pzanowski
BY Carney, Dickey & Pierce
ATTORNEYS

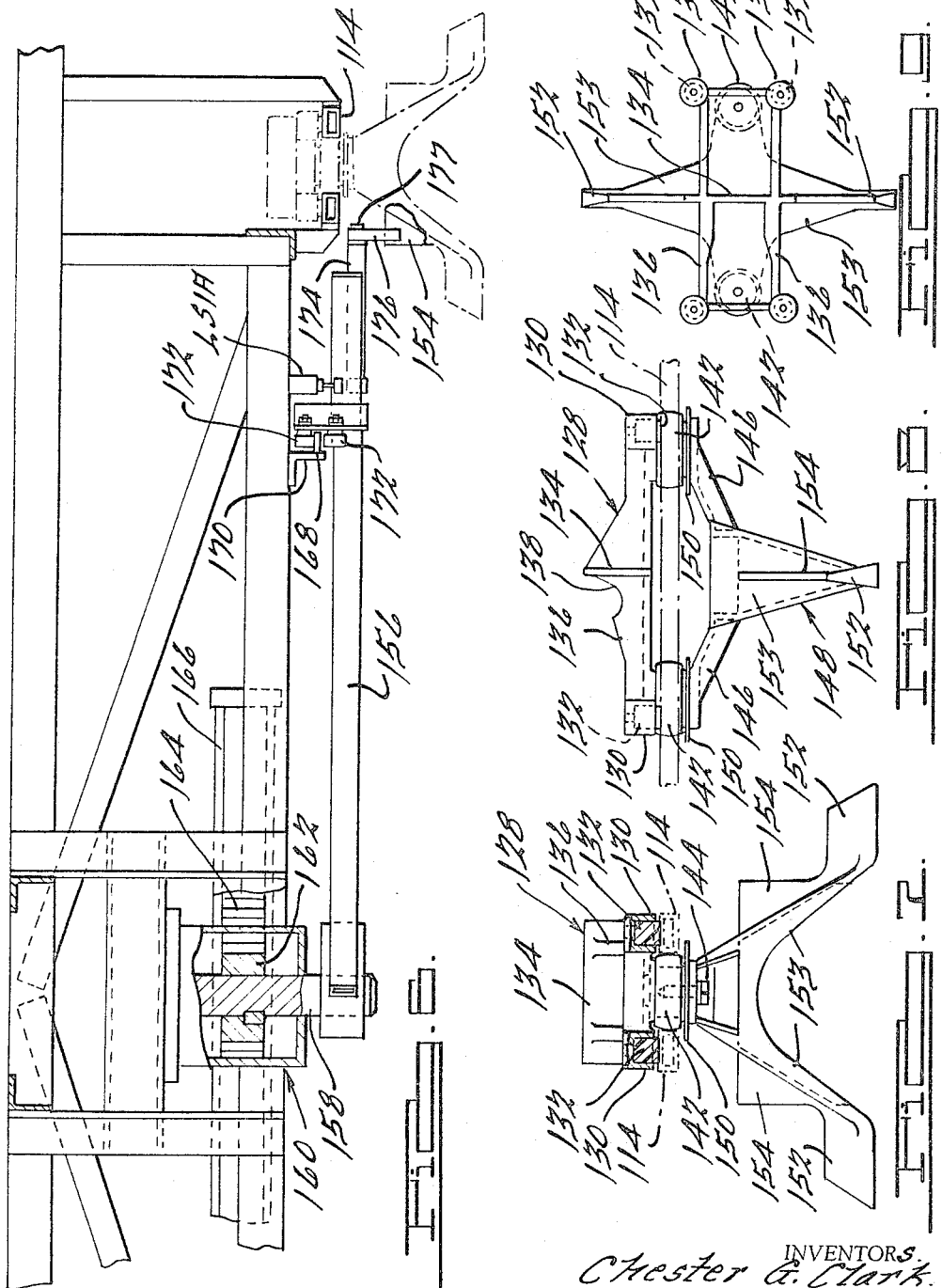

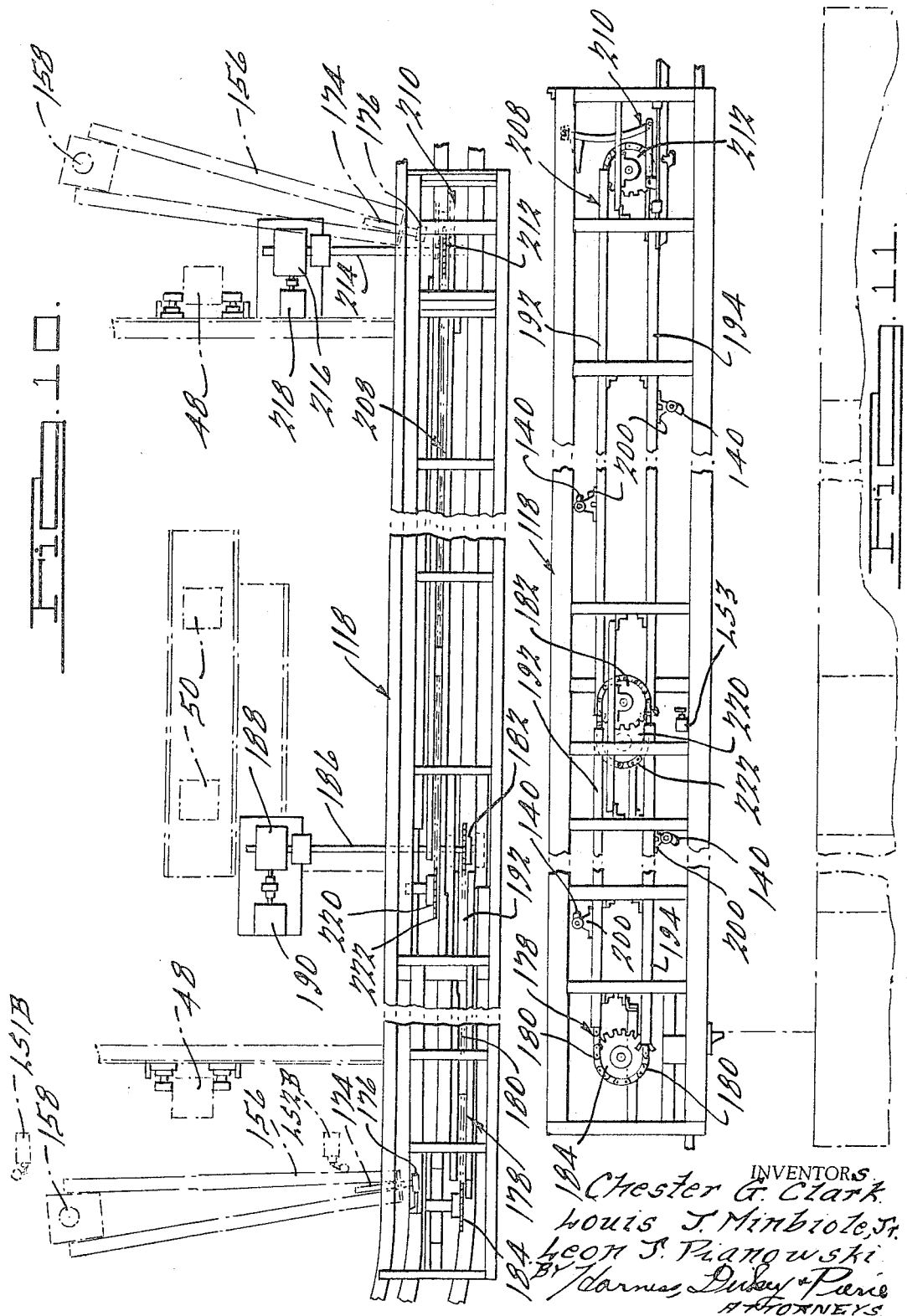

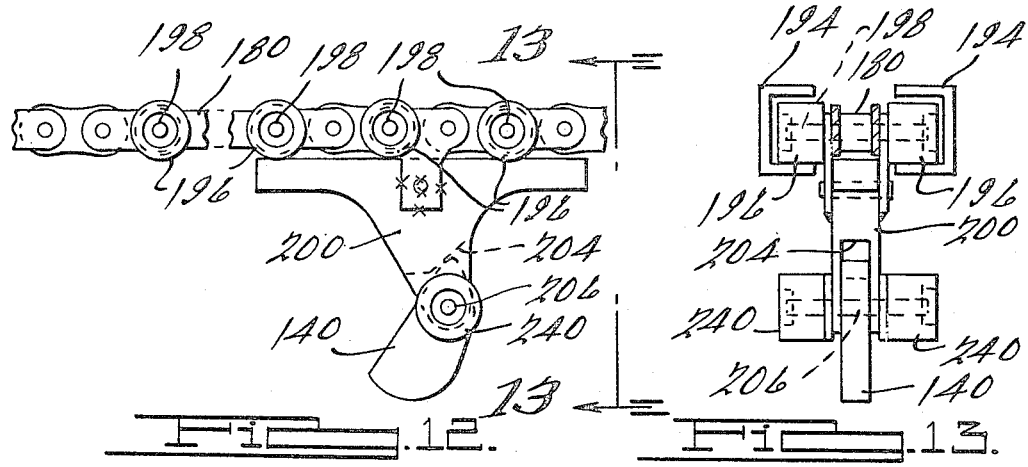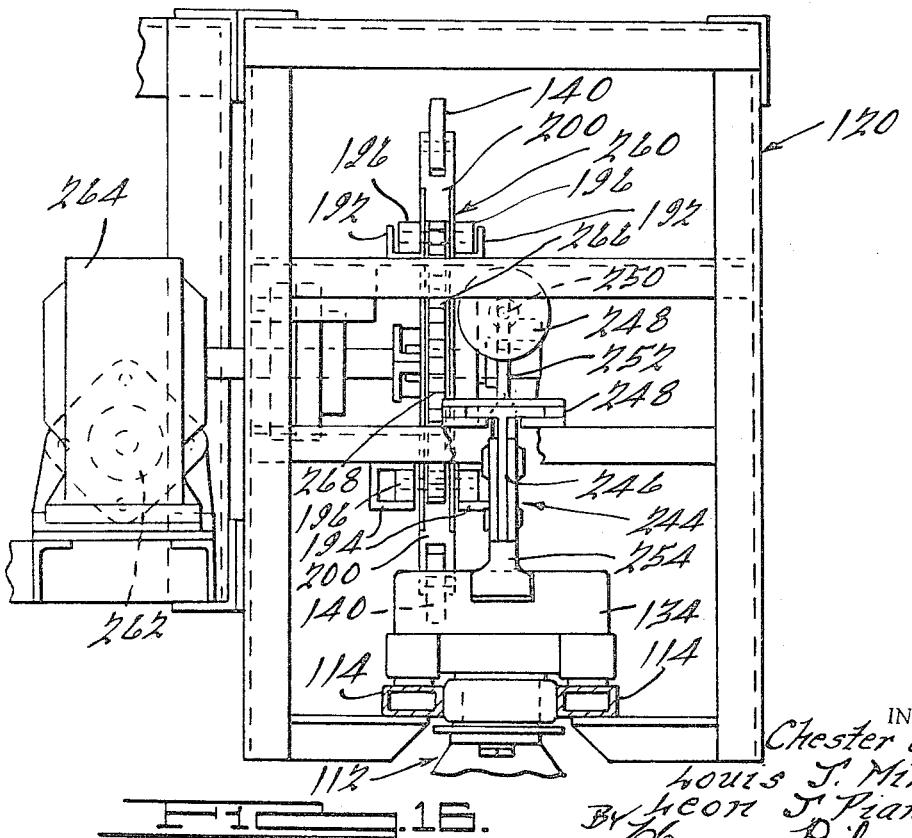

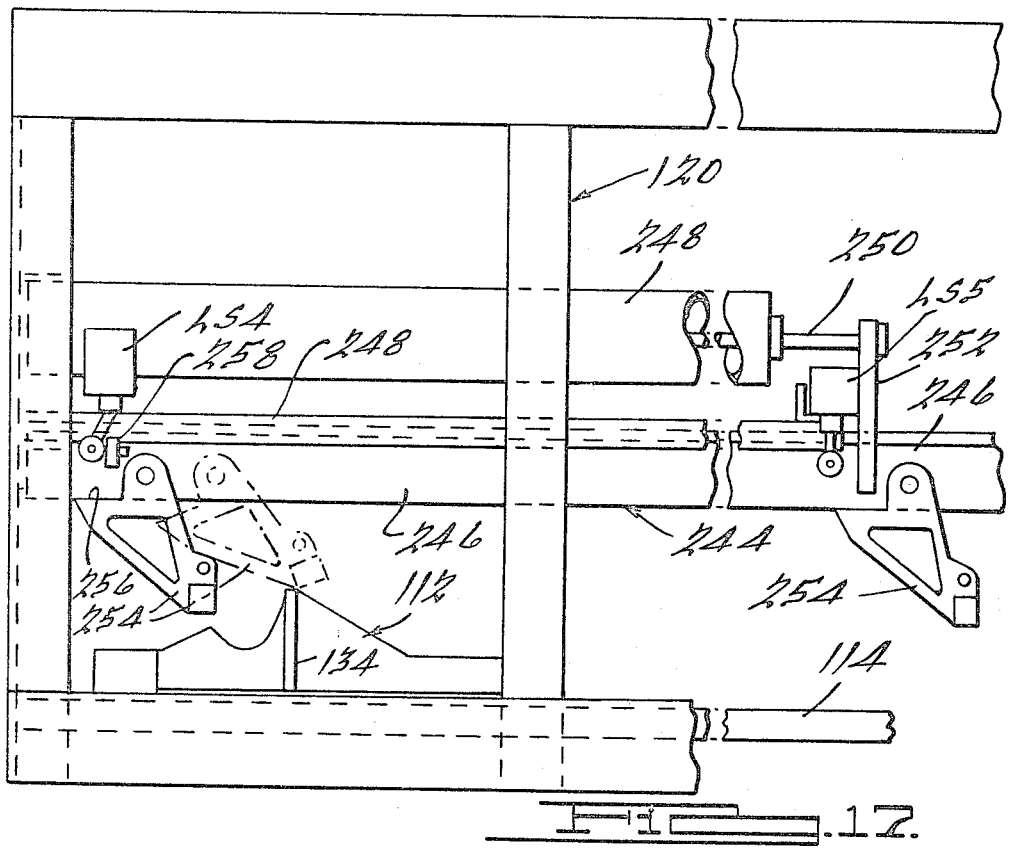
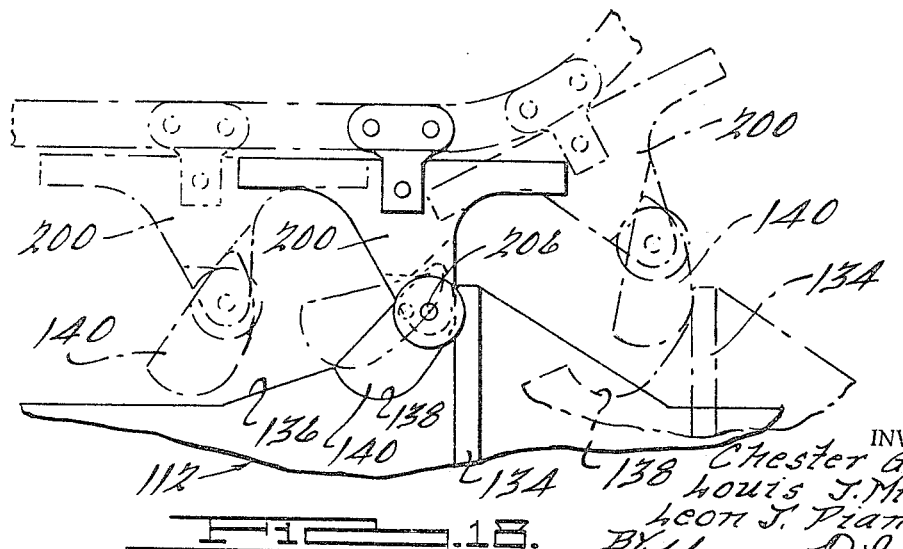

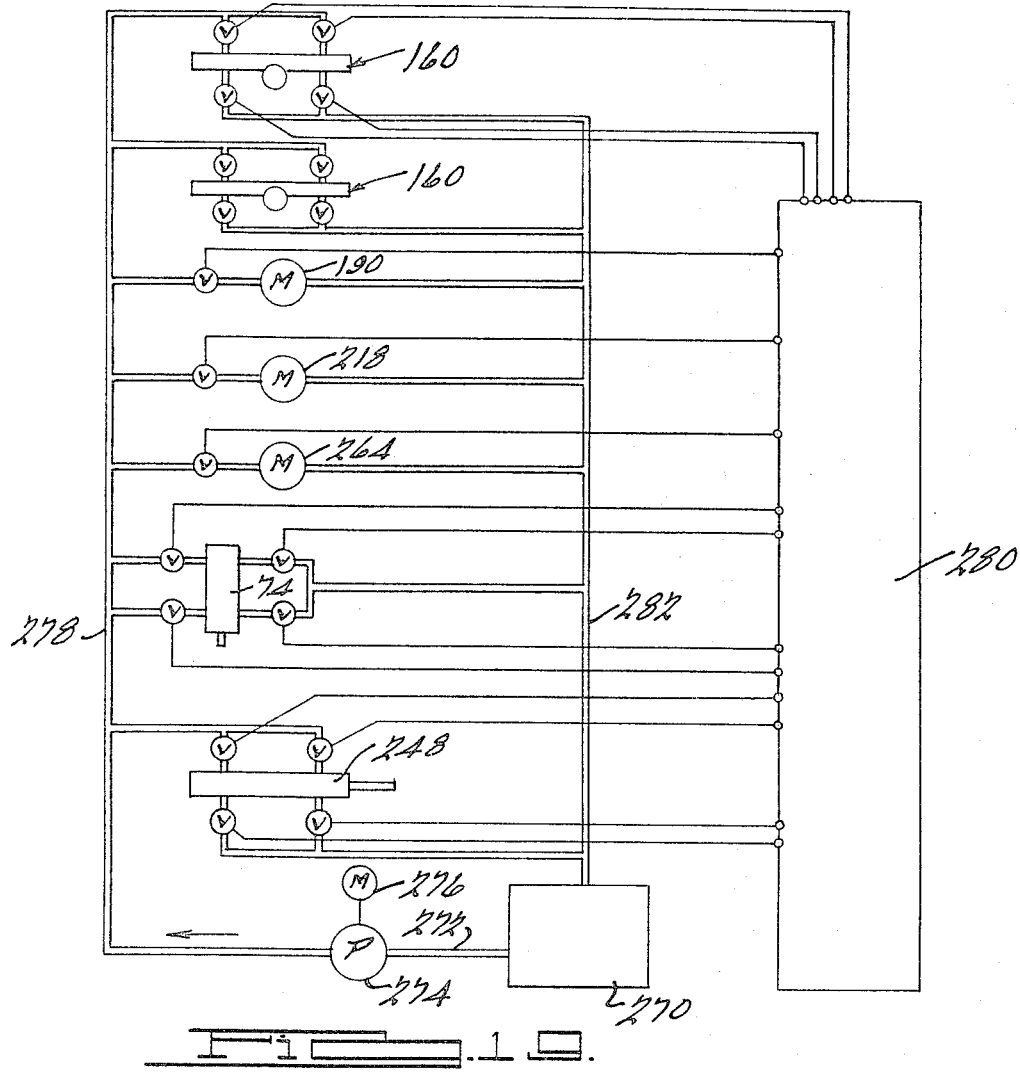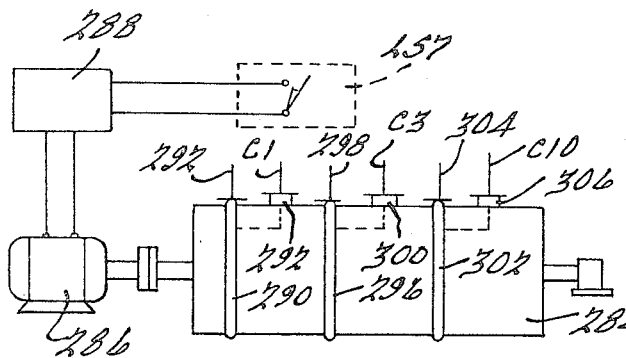

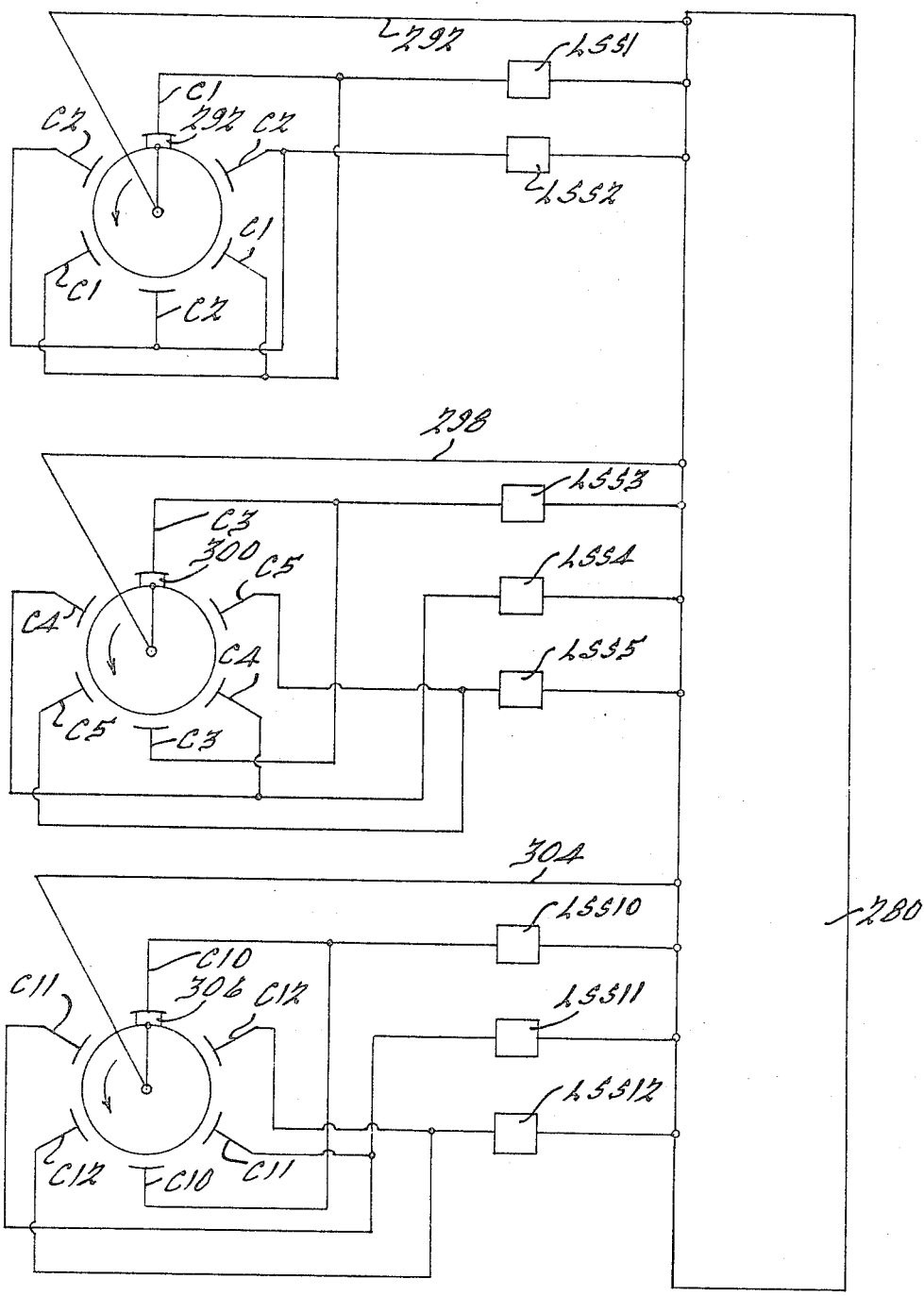

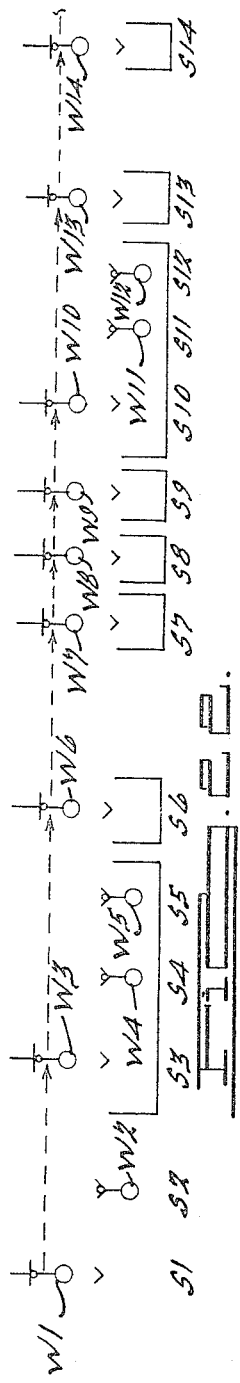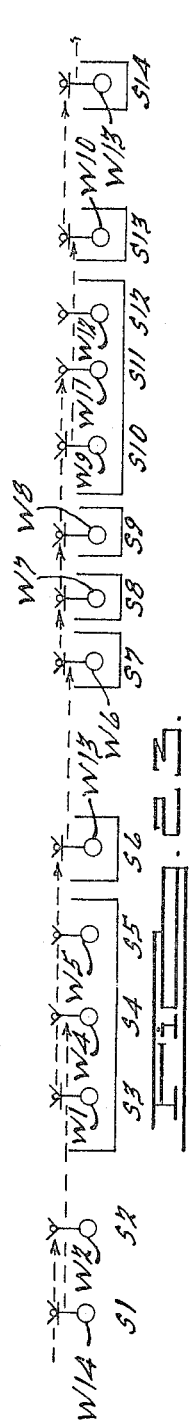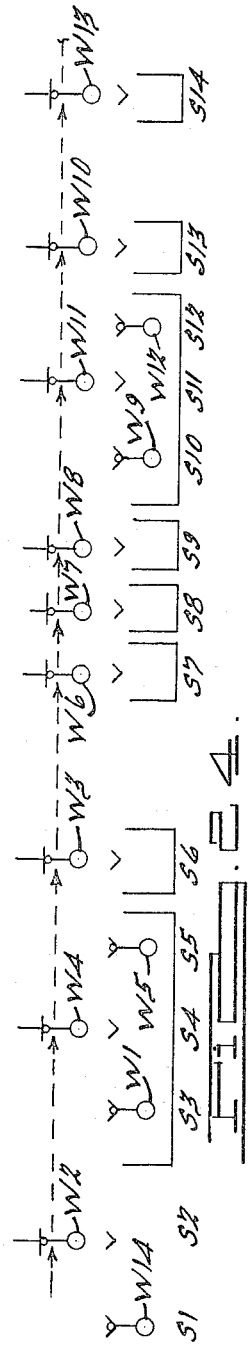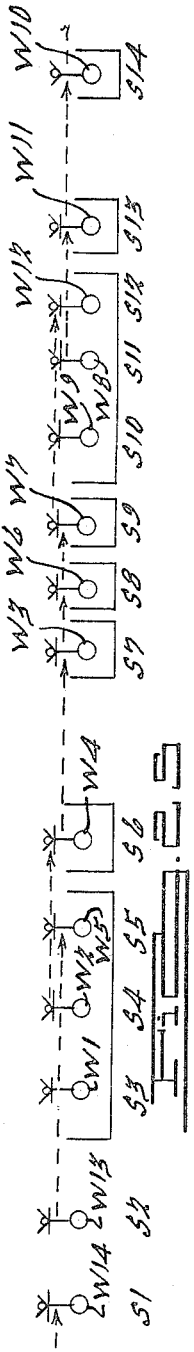

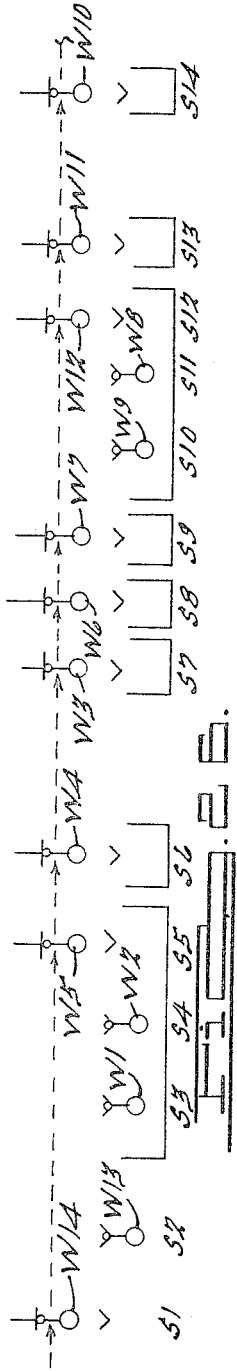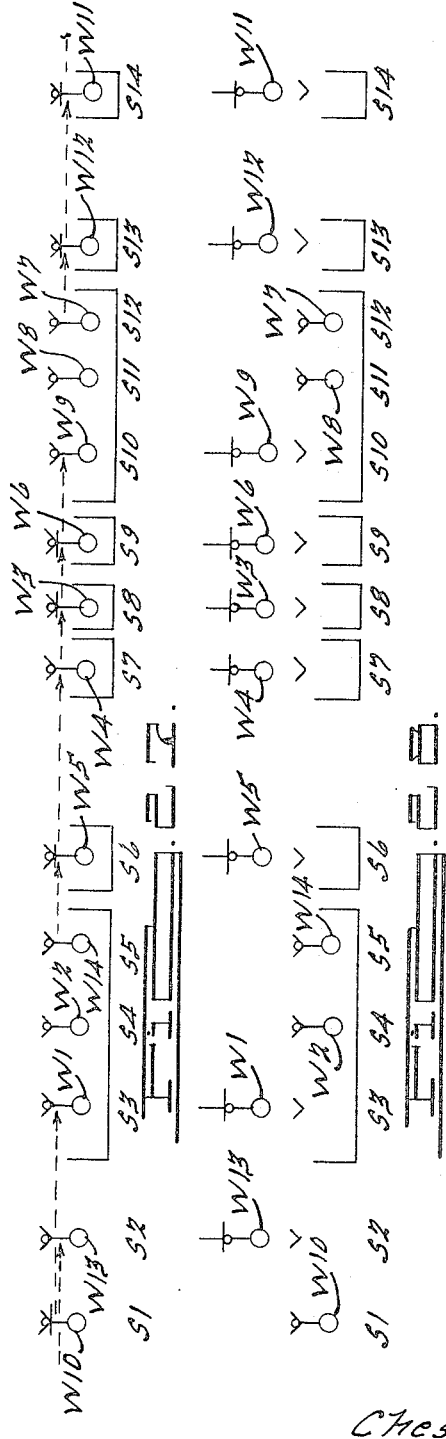

United States Patent Office 3,381,792
Patented May 7, 1968

3,381,792
CONVEYING APPARATUS
Chester G. Clark, Grosse Pointe Woods, and Louis J. Minbiole, Jr., and Leon J. Pianowski, Detroit, Mich., assignors to The Udylite Corporation, a corporation of Delaware
Filed June 22, 1966, Ser. No. 559,559
10 Claims. (Cl. 198—19)

The present invention broadly relates to conveying machines, and more particularly, to an improved conveying machine of the type which is particularly applicable for transferring workpieces through a preselected processing cycle. More specifically, the present invention is directed to an improved conveying apparatus which is operative for transferring workpieces through a preselected cell-type operating sequence such as may be encountered during electrochemical, electroplating or like treating operations.

Conveying machines of the general category to which the present invention is applicable are in widespread commercial use for providing automatic handling and transportation of workpieces through preselected operating cycles. Machines of the foregoing general type are particularly applicable for conveying workpieces through an automatic sequentially-phased treating cycle which usually includes one or more electrochemical and electroplating operations. Continuous technological advancements in the electroplating and electrochemical processing fields, as well as large variations in the nature and types of workpieces processed, has occasioned an increasing need for conveying machines which provide increases in the efficiency in which workpieces can be automatically handled, while concurrently providing for a wide range of versatility and flexibility in adapting the machine cycle to accommodate workpieces of different types which deviate in the operating sequence to which they are subjected.

In particular, there has been an increasing need for conveying machines which are adaptable for a cell-type operating cycle wherein selected ones of a series of treating stations are utilized as individual treating cells and workpieces are inserted and are removed from such treating cells in a prescribed sequentially-phased operating cycle. The use of such a cell-type plating operation is usually occasioned as a result of the complexity in the contour or configuration of some of the workpieces, thereby requiring, for example, a nested anode arrangement in an electroplating operation in order to achieve the requisite uniformity in the plating of the surfaces of the workpieces thus treated. The use of such a nested anode arrangement in electroplating tanks prevents substantial movement of the workpieces while immersed in the electroplating solution, and accordingly, in order to achieve the requisite treatment time, a plurality of such treatment cells are required to accommodate a corresponding plurality of such work racks. Unprocessed work racks, in accordance with a typical cell-type operating cycle, are inserted in a vacated cell in which they are allowed to remain for a preselected time period during which the remaining cells are successively vacated and replenished with new work racks for processing. To achieve such a coordinated cell-type operation in machines of the types heretofore known, a relatively complex, costly and cumbersome machine structure has been required, which has detracted from a more widespread use and acceptance of such machines.

It is, accordingly, a principal object of the present invention to provide an improved conveying machine which overcomes the disadvantages and provides for many benefits heretofore unattainable in conveying machines of the types heretofore known.

Another object of the present invention is to provide an improved conveying apparatus which is readily adaptable to a turn-around type of operation in which the work carriers and the workpieces transported thereby are conveyed in a continuous loop or circuit and can be readily loaded and unloaded from the machine at a convenient point along their path of travel.

Still another object of the present invention is to provide an improved conveying apparatus which can be readily modified so as to provide for variations in the processing sequence to which the workpieces are to be subjected as may be required from time to time.

A further object of the present invention is to provide an improved conveying apparatus which provides for an automatic sequential cell-type processing cycle, in combination with the conventional, in series transfer of the workpieces, and wherein the coordination of the transfer movements of the workpieces can be simply achieved along all portions of the path of travel of the workpieces.

A still further object of the present invention is to provide an improved conveying machine which is of simple and compact construction, of durable and efficient operation, and of economical and versatile manufacture and operation.

The foregoing and other objects and advantages of the present invention are achieved by a conveying machine including a central framework incorporating an elevator chassis thereon which is movable to and from a raised position and a lowered position. Suitable rail means are connected to the elevator chassis and are movable thereby. The rail means extend along a series of treating stations and a plurality of work rack supporting means are located at each of the work stations for receiving and supporting a work rack incorporating workpieces thereon to be processed at the treating station. A plurality of work carriers are movably supported on the rail means and incorporate engaging means thereon for engaging and suspending a work rack over a treating station and during the transfer thereof between stations. When the elevator chassis is in a lowered position, the work carriers and the engaging means thereon are disposed below and in horizontal clearance positive relative to the work racks disposed at the rack supporting means. Work carrier transfer means are incorporated on the elevator chassis and are effective to transfer the work carriers and work racks suspended therefrom above the treating stations when the elevator chassis and rail means are in a raised position, and for transferring the work carriers without any work racks above the treating stations when the rail means are in the lowered position. Suitable sensing means are provided for advancing the empty work carriers to positions in vertically aligned relationship beneath appropriate work racks which are scheduled to be lifted from the treating station in response to the next ascending movement of the elevator chassis. Similarly, means are provided for transferring a work carrier and a work rack thereon while in the raised position in vertical alignment above the rack supporting means at a station which has been vacated for depositing the work rack in response ot the next descending movement of the elevator chassis.

In accordance with a preferred embodiment of the present invention, the rail means are formed in a continuous loop providing for a return-type operation. It will be appreciated by those skilled in the art that the machine comprising the present invention is also applicable to conveying apparatus of the so-called straight through type wherein the work carriers and workpieces to be processed are loaded at one end thereof, and are subsequently unloaded from the opposite end of the machine.

Other objects and advantages of the present invention will become apparent upon a reading of the following description, taken in conjunction with the accompanying drawings, wherein:

FIGURE 1 is a plan view of a typical arrangement of treating receptacles through which workpieces are adapted to be sequentially transferred by the conveying machine comprising the present invention;

FIGURE 2 is a transverse vertical sectional view through the conveying machine comprising the present invention and constructed in accordance with the preferred embodiments thereof;

FIGURE 3 is a side elevational view of the central machine framework illustrating in particular the lift mechanism for the elevator chassis movably mounted thereon;

FIGURE 4 is a fragmentary plan view of the right-hand end of the elevator chassis as viewed in FIGURE 3;

FIGURE 5 is a transverse vertical sectional view through the right-hand chassis section shown in FIGURE 4, and taken along the line 5—5 thereof;

FIGURE 6 is a fragmentary vertical sectional view through the right-hand end portion of the elevator chassis, as shown in FIGURE 4, and taken substantially along the line 6—6 thereof, showing, in particular, the disposition of the rotary transfer means thereon;

FIGURE 7 is an enlarged end elevational view, partly in section, of a work carrier movably and guidably mounted on the supporting rail;

FIGURE 8 is a side elevational view of the work carrier shown in FIGURE 7;

FIGURE 9 is a plan view of the work carrier illustrated in FIGURES 7 and 8;

FIGURE 10 is a fragmentary plan view of the left-hand side portion of the elevator chassis as viewed in FIGURE 2;

FIGURE 11 is a fragmentary side elevational view of the transfer mechanism as shown in the chassis section illustrated in FIGURE 10;

FIGURE 12 is a magnified fragmentary side elevational view of a pivotally mounted pusher supported on a flexible roller chain;

FIGURE 13 is a transverse vertical sectional view of the pusher element and roller chain shown in FIGURE 12, and taken along the line 13—13 thereof;

FIGURE 16 is a fragmentary magnified end elevational view of the right-hand portion of the elevator chassis as viewed in FIGURE 2;

FIGURE 17 is a fragmentary side elevational view, partly in section, of the elevator chassis and transfer system as illustrated in FIGURE 16;

FIGURE 18 is a fragmentary side elevational view illustrating the locking relationship between an arcuate pusher and a work carrier;

FIGURE 19 is a diagrammatic view illustrating the hydraulic circuit of the conveying machine;

FIGURE 20 is a diagrammatic side elevational view of a sequencing drum incorporated in the central control circuit for selectively energizing the station limit switches, achieving thereby a preselected sequentially-phased cell operating cycle in the multiple-station receptacles;

FIGURE 21 is a wiring diagram of the sequencing drum and the contacts for selectively energizing certain ones of the station limit switches, and FIGURES 22 through 28, inclusive, are schematic side elevation views illustrating a typical operation of the conveying machine comprising the present invention.

Figure 14:
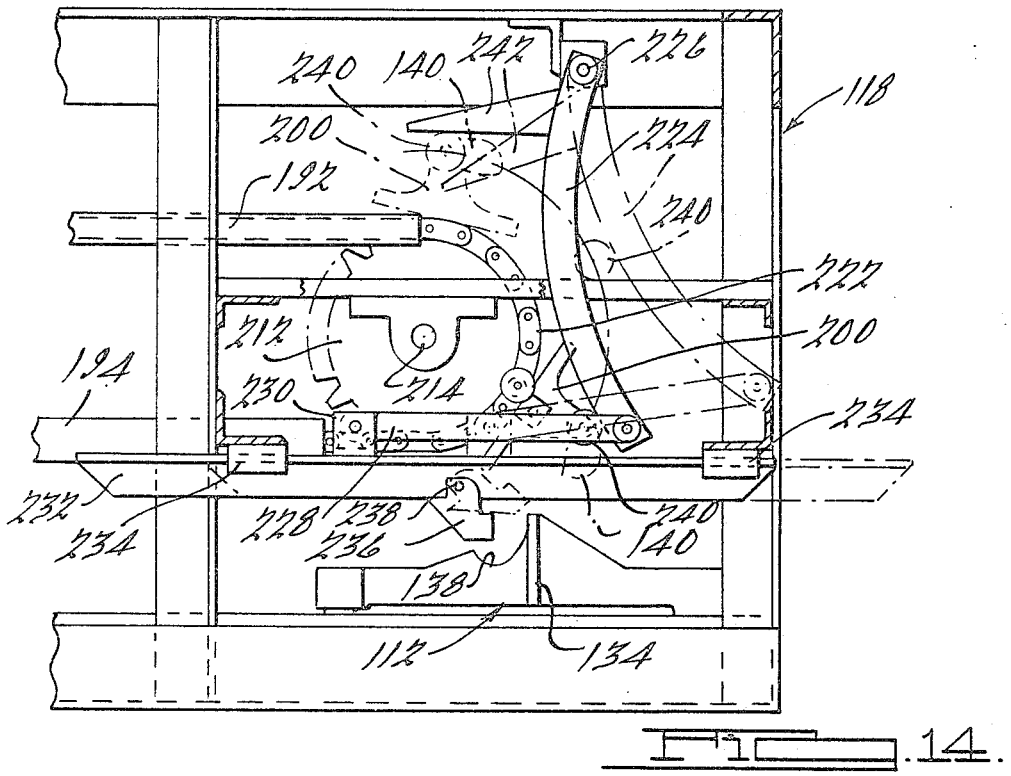
FIGURE 14 is a magnified fragmentary side elevational view of the right-hand portion of the elevator chassis section, as illustrated in FIGURE 11, and illustrating, in particular, the cam-actuated aligning mechanism thereon.

Referring now in detail to the drawings, and as may be best seen in FIGURE 1, a typical layout of treating stations is illustrated through which workpieces are sequentially conveyed in accordance with the apparatus comprising the present invention. In the typical arrangement illustrated in FIGURE 1, the treating receptacles are arranged in two aligned rows through which the workpieces are conveyed in a counterclockwise direction. For the purposes of illustration, stations S1 and S2 may be conveniently employed as load-unload stations at which the workpieces are loaded and unloaded from the machine. Two such stations are employed to provide adequate time for the removal of workpieces from the work racks which have completed the treating cycle and the replacement thereof with fresh workpieces or freshly loaded work racks which are to undergo the processing cycle. On passing beyond station S2, the work racks undergo a cell-type cleaning operation in the three-station receptacle or tank, indicated at 30, comprising stations S3–S5, inclusive. Thereafter, the work racks are transferred successively to station S6, comprising treating receptacle 32, in which they are subjected to a rinse operation, followed thereafter by a transfer around the right-hand arcuate end portion of the machine as viewed in FIGURE 1 to station S7 consisting of single-station receptacle 34, at which they are subjected to an acid treatment. The work racks are thereafter transferred to station S8, corresponding to single-station receptacle 36, at which the racks are subjected to a rinse operation, followed by a second rinse operation at station S9, comprising single-station treating receptacle 38.

Upon emergence from treating tank 38, the work racks and the workpieces thereon are subjected to a cell-type operation at either of stations S10, S11 or S12 of multiple-station treating receptacle 40, after which they are transferred to station S13 and are rinsed in single-station tank 42. For the purposes of illustration, the multiple-station tank 40, comprising stations S10–S12, may comprise an electroplating tank for applying a metallic plating, such as zinc, tin or cadmium, to the metallic workpieces. Upon leaving rinse station S13, the work racks are transferred around the left-hand end portion of the machine and are hot rinsed at station S14, in single-station tank 44, after which they are transferred to either station S1 or S2 for unloading and reloading thereof.

It will be appreciated that the specific arrangement of treating receptacles, and the particular processing cycle described, is merely illustrative of one of a variety of arrangements and processing sequences to which workpieces can be automatically subjected in accordance with the conveying machine subsequently to be described. In order to facilitate an understanding of the machine construction and its operation, the description as hereafter provided is related to the exemplary layout of treating receptacles as illustrated in FIGURE 1. Appropriate modifications of the transfer mechanisms, treating receptacle arrangements, cell-type plating tanks, and the like, can readily be made within the scope of the present invention to adapt the machine to any particular type of processing cycle as may be desired.

The foregoing typical operating cycle is accomplished through the coordinated operation of a series of transfer mechanisms which are operative for advancing suitable work carriers and the work racks thereon in a prescribed coordinated sequence through the several treating stations. The increments through which the several transfer mechanisms operate have been indicated in FIGURE 1 by the letter X with a suffix number affixed thereto. Accordingly, a first transfer mechanism is operative to advance the work carriers and work racks from station S14 to either station S1 or S2, and thereafter to the partition of multiple-station treating tank 30, at which point a second transfer mechanism is operative to advance the work carriers and work racks through an increment encompassed by the arrow indicated at X2. At the outlet end of the multiple-station tank 30, an aligning transfer mechanism is effective to advance the work racks to a position above station S6, and through an increment indicated at X3. Two separate end transfer mechanisms at each end of the machine are effective to convey the work racks around the arcuate turn-around sections as indicated by the dotted arrows designated as X4 and X8, respectively. A reciprocable-type transfer mechanism is effective to transfer the work racks in series through an increment indicated at X6 from station S7 to a position at station S9, at which another transfer mechanism is effective to transfer the work racks through an increment indicated at X7 after the racks have been deposited at one of the cell stations represented by stations S10, S11 and S12. The specific construction and coordinated operation of the individual transfer mechanisms will subsequently be described with reference to the arrangement as illustrated in FIGURE 1.

The structure of the conveying machine, as best seen in FIGURES 2 and 3, comprises a framework consisting of a plurality of beams defining a platform 46, to which a series of pairs of columns, comprising end columns 48 and center columns 50, are rigidly secured at their lower ends. Each of the pairs of end columns and center columns are transversely connected by means of cross beams 52 extending between the upper portions thereof. The upper ends of the center columns 50 are longitudinally interconnected by means of U-shaped beams 54, which in turn are longitudinally connected by channel members 56 to the inner ends of U-shaped frames 58 affixed to the upper ends of each of the end columns 48.

An elevator chassis 60 is guidably mounted for up and down movement on the upright end columns 48 and center columns 50 of the machine framework. The elevator chassis 60, as best seen in FIGURE 2, comprises a central section comprising upper and lower transverse beams 62, which are braced at intervals by diagonal braces 64 and are interconnected by longitudinally extending beams 66. Guided movement of the elevator chassis to and from a lowered position, as shown in solid lines in FIGURE 2, to a raised position, as shown in phantom, is achieved by the coaction between rollers 68 mounted on brackets 70 affixed to the elevator chassis, and which rollers are disposed in rolling bearing contact against the side surfaces of the upright columns 48, 50. When the elevator chassis is in its fully lowered position, as shown in FIGURE 2, suitable adjustable stops, indicated at 72, affixed to the inner surfaces of the columns 50 are adapted to coact with the underside of transverse braces 62 to prevent descent of the chassis beyond a preselected lowered position.

Movement of the elevator chassis between the lowered and raised positions is achieved, as best seen in FIGURE 3, by a double-actuating fluid-actuated lift cylinder 74 mounted with its blank end affixed to the underside of the U-shaped beam 54 and with its rod end secured by means of a clevis fitting 76 to a crosshead 78 extending transversely between central upright columns 50. A guide rail 80 is affixed to the opposed surfaces of each of the upright columns 50, and the side edges of the crosshead 78, as shown in FIGURE 3, are formed with guide shoes 82 which are disposed in sliding guided relationship on the guide rails 80. The crosshead, as shown in solid lines in FIGURE 3, is in the raised position corresponding to the position when the elevator chassis is fully lowered. The crosshead, as fragmentarily shown in phantom in FIGURE 3, when in the fully lowered position in response to the extension of the piston rod of the lift cylinder 74 is effective to move the elevator chassis to the fully raised position.

Transfer of movement of the crosshead to the elevator chassis is achieved by a pair of upright bars 84 affixed to the upper edges of the crosshead and to the upper ends of which lift chains 86 are connected, and which in turn are trained over sprockets 88 rotatably mounted between the upstanding flanges of U-shaped beams 54, as best seen in FIGURES 2 and 3. The sprockets 88 of adjacent U-shaped beams 54 are interconnected by a line shaft 80 for synchronizing the rotation thereof in response to the vertical reciprocation of the crosshead 78. One of the lift chains 86, as best seen in FIGURE 3, extends over the sprocket 88 disposed within the U-shaped beam 54, and thereafter passes downwardly and is connected to a suitable outrigger 92 on the elevator chassis adjacent to the central upright columns 50. A second series of lift chains pass upwardly over the sprockets 88, and thereafter extend horizontally through the channel members 56 and are trained around idler sprockets 94 rotatably mounted in the U-shaped frames 58 at the upper ends of end columns 48, after which they extend downwardly and, similarly, are affixed to the chassis framework. In accordance with the foregoing arrangement, actuation of the lift cylinder 74 is effective to apply a lifting force at several uniformly disposed locations of the elevator chassis so as to avoid any skewing or binding thereof during its ascending or descending movement. It will be appreciated by those skilled in the art that alternative satisfactory lifting mechanisms, such as a rack and pinion, screw and nut, flexible cable, etc. mechanism, can be satisfactorily employed in lieu of the specific chain and cylinder mechanism hereinbefore described.

The side edge portions and end portions of the elevator chassis 16 extend along and above the aligned series of treating stations, such as the stations S1–S14, as illustrated in FIGURE 1. Each treating station is defined as best seen in FIGURES 2 and 3 by a work rack supporting device consisting of a pair of spaced V-blocks or saddles 96 having an upwardly diverging cavity for removably receiving and supporting the end portions of a cross bar of a work rack, indicated at 98 in FIGURE 2. As shown in FIGURES 2 and 3, the saddles 96 are mounted in transversely-aligned longitudinally spaced intervals to the upper portions of beams 100, which extend along the inner and outer edges of the treating stations and are supported on the upper ends of upright braces 102.

Each of the work racks 98, as best seen in FIGURE 2, consists of a transverse bar 104 of a square cross section to which a pair of opposed upstanding brackets 106 are affixed and project upwardly therefrom. An inwardly directed engaging member 108 is affixed to each of the inner surfaces of the brackets 106 and is formed with a cavity 110 in the end thereof, which is adapted to removably receive a corresponding V-shaped end portion of a work carrier 112 movably mounted on the elevator chassis. The engaging members 108 are preferably composed of an electrically insulating material, or alternatively, the cavity 110 is provided with an electrically insulating coating thereover in order that the work racks 98 and the workpieces suspended therefrom can be electrified at such stations at which an electroplating or electrochemical treatment is to be performed without effecting a corresponding electrification of the work carrier or other portions of the machine.

The work carriers 112, as shown in FIGURE 2, are movably supported on rail means which extend in a continuous loop configuration above the treating stations. The rail means comprise a pair of spaced-apart rails or tracks, indicated at 114, which extend in straight sections along the side portions of the machine and are interconnected by arcuate turn-around sections at each of the end portions of the machine, as illustrated in FIGURE 4. Along the straight side sections of the machine, the rails 114 are rigidly supported on opposed braces 116, which are affixed to the lower edges of a box-type framework 118 affixed to the left-hand side of the elevator chassis, as viewed in FIGURE 2, and a box-type framework 120 affixed to the right-hand edge of the elevator chassis, as viewed in FIGURE 2. The box-type frameworks 118, 120 comprise longitudinally extending angle iron stringers 122 which are rigidly affixed together at spaced intervals therealong by vertical and transverse braces 124. The arcuate end portions of the rails 114, as best seen in FIGURES 4 and 5, are similarly supported by means of A-shaped braces 126 rigidly secured to the arcuate periphery of the end portions of the elevator chassis. In accordance with a preferred embodiment of the present invention, the rails 114 are of a square-shaped tubular construction providing a high degree of strength at a reduced weight per unit length.

The work carriers 112, as best seen in FIGURES 7–9, are movably and guidably mounted between the rails 114 during the course of their entire travel around the conveying machine. The work carrier 114 consists of a composite body construction including an upper plate 128 having four downwardly directed cup-shaped members 130 integrally formed at each corner thereof, into which a cylindrically-shaped dry lubricant material 132, such as a molybdenum disulfide material, is adapted to be removably secured. The dry lubricant material 132 is disposed with the lower face thereof positioned in sliding bearing contact against the upper face surface of the rail 114. The central portion of the upper plate 128 is provided with a transversely extending web or flange 134 which is rigidified by means of a pair of longitudinally extending webs 136 affixed to and extending rearwardly thereof, as best seen in FIGURE 8. In the exemplary embodiment illustrated, each of the longitudinal webs 136 is formed with an arcuately-shaped cavity 138, which is adapted to receive a corresponding arcuately-shaped pusher 140, as shown in FIGURE 18. The rearward surface of the transverse web 134 is adapted to provide a bearing surface against which the transfer mechanisms, subsequently described, are adapted to be disposed in pushing relationship for advancing the work carrier along the supporting rails.

Appropriate longitudinal and transverse alignment of the work carrier relative to the rails 114 is achieved by means of a pair of rollers 142, each of which is rotatably attached by means of a screw 144, extending upwardly between the end of the upper plate 128 and the projecting arm 146 of the lower pickup member 148 comprising the lower portion of the work carrier. The roller 142 is of a width such that the periphery thereof is adapted to be disposed in rolling bearing contact with the inner edge of one of the rails 114, thereby maintaining the work carrier in appropriate longitudinal alignment during the course of its travel along the straight, as well as arcuate, turn-around sections of the rails. A washer or stripper plate 150 is disposed below each of the rollers 142, as best seen in FIGURES 7 and 8, which is of a peripheral diameter greater than the spacing between the inner edges of the rails 114. The washers 150 serve the purpose of restricting undesirable tilting movement of the work carrier in a vertical plane preventing disengagement of the roller 142 from between the rails 114.

As shown in FIGURES 7–9, inclusive, the lower pickup member 148 of the work carrier is of a generally inverted V-shaped configuration and is provided with diametrically-opposed and transversely extending engaging arms 152 which are of an inverted V-shaped cross section and which are adapted to be slidably received in the inverted V-shaped cavities 110 of the engaging members 108 of the work racks 98, as previously described in connection with FIGURE 2. The upper outer edges of the downwardly extending legs 153 of the pickup member 148 are also formed with transversely extending tabs or ears 154 which are provided for facilitating engagement of the work carrier by a suitable pusher mechanism such as illustrated in FIGURE 6 providing for a transfer of the work carrier around the arcuate end portions of the conveying machine.

It will be apparent from the arrangement as hereinabove described, that each of the work carriers 112 is adapted to be intermittently advanced along the rails 114 and is moved to and from a raised position and a lowered position, as shown in FIGURE 2, in response to the movement of the elevator chassis between the raised position, as shown in phantom, and the lowered position, as shown in solid lines. When in the lowered position, it will be noted that the engaging arms 152 are disposed below and out of contact with the engaging members 108 on the work rack, and moreover, that the work carrier is in longitudinal and horizontal clearance relationship relative to the work rack. This relationship is achieved by lowering the elevator chassis a preselected increment beyond that point at which the work rack is deposited on the saddles 96 disposed at each of the treating stations. Accordingly, the work carrier, when the elevator chassis is in the fully lowered position, can be advanced without disturbing the disposition of the work racks at the stations.

When the work carriers are disposed below and in vertical alignment with the engaging members 108 on the work racks, movement of the elevator chassis from the lowered position, as shown in solid lines in FIGURE 2, to a raised position effects an engagement and lifting of the work racks to an elevated position, whereupon the workpieces suspended therefrom are disposed in vertical clearance relationship relative to the partitions separating adjoining treating receptacles. Accordingly, advancement of the work carriers and the work racks suspended therefrom when the elevator chassis is in the raised position, provides for an uninterrupted path of travel of the work racks. In accordance with the foregoing arrangement, the operational sequence of the elevator chassis and the work transfer mechanisms is such as to effect horizontal transfer of a work carrier and a work rack supported thereby when the elevator chassis is in a raised position, and for a horizontal transfer of a work carrier only, devoid of any work rack, when the elevator chassis is in the fully lowered position.

Intermittent advancement of the work carriers, and work carriers incorporating work racks suspended therefrom, is achieved by a series of transfer mechanisms operatively coordinated so as to provide for a continuity of work flow through the treating stations. The transfer of the work carriers around the arcuate turn-around end portions of the conveying machine, and through the increments designated as X4 and X8 in FIGURE 1, is achieved by a transfer arm 156 rotatably mounted at each end of the elevator chassis at substantially the center of arcuate curvature of the rail 114 and is movable about a vertical axis, as is best depicted in FIGURES 4, 5 and 6. The transfer arm at each end of the elevator chassis is substantially identical, and an understanding of one will suffice for the purposes of understanding the present invention. In accordance with the specific embodiment illustrated, the transfer arm 156 is fixedly secured to a shaft 158 extending downwardly from a torque box 160 incorporating a pinion gear 162 affixed thereon which is disposed in constant meshing relationship with a rack 164. The rack 164 is slidably mounted in a cylinder 166, to the ends of which a suitable pressurized fluid is alternatively admitted for effecting longitudinal reciprocation of the rack 164 relative to the pinion gear 162. In accordance with this arrangement, reciprocation of the rack 164 effects a corresponding rotation of the transfer arm 156 between a fully retracted position, as shown in FIGURE 4, to an advanced position in which the arm is rotated through an increment slightly greater than 180°. Alternative suitable drive means can be employed for effecting coordinated rotation of the transfer arm, such as, for example, a reversible motor drivingly coupled to the shaft 158 through a suitable gear reducing mechanism.

The transfer arm 156 is supported in a substantially horizontal plane by means of an arcuate track 168 affixed to an arcuate angle iron member 170 attached to the underside of the elevator chassis. Two pairs of rollers 172, affixed to the transfer arm, are disposed in rolling bearing contact with opposite sides of the arcuate track 168. The end portion of the transfer arm 156 is provided with a radially extending rod 174 to the end portion of which a pivotally mounted pusher 176 is connected and which is adapted to engage the side ear 154 on the work carrier, effecting an advancement thereof in response to an arcuate movement of the transfer arm. The pusher 176 is pivoted about pin 177 at the end of the rod 174 so as to enable retraction of the transfer arm to the fully retracted position, as shown in FIGURE 4, and wherein the pusher 176 is able to pivot to the position shown in phantom upon coming in contact with the upper edge of the ear 154 (FIGURE 6), enabling further retraction of the arm to a position behind the work carrier at which point the pusher 176 again pivots downwardly through the action of gravity preparatory to the next advancing movement of the transfer arm. The pivoting connection of the pusher 176 on the pin 177 is such so as to prevent any pivoting thereof during the advancing movement of the transfer arm.

In the particular arrangement, as illustrated, the transfer arm is operative for effecting a transfer of the work carriers and the work racks suspended therefrom through an arcuate travel of 180°. It will be appreciated that the transfer arm and the drive means therefor can be so controlled to effect transfer of the work carriers around the arcuate end portion of the conveying machine in approximately 90° increments, wherein an additional treating station is provided at each of the machine ends as may be desired. The position of each of the transfer arms is signaled to the central control circuit of the machine by suitable sensing devices, such as retract limit switches LS1A and LS1B, respectively, as illustrated in FIGURES 4 and 10, and advance limit switches LS2A and LS2B, respectively. The position of limit switches LS1A and LS2A is typically illustrated in FIGURE 4, while similar dispositions of the limit switches LS1B and LS2B for the other transfer arm are illustrated in FIGURE 10. The sensing devices for the transfer arms are effective to communicate to the control system when the fully retracted and fully advanced positions of the transfer arms are attained which are suitably interlocked with other sensing devices to assure that the operative components have attained appropriate positions prior to the commencement of the next step of the operating cycle. Additionally, the sensing devices also communicate to the central control circuit in order that the appropriate power source is de-energized when the proper position of the transfer arm is achieved.

It will be apparent from the foregoing that the torque arm at the left-hand end of the machine, as viewed in FIGURE 1, is effective during operation thereof to transfer a work carrier from a position in alignment with station S13 to a position in alignment with station S14. Similarly, the transfer arm located at the right-hand end of the machine, as viewed in FIGURE 1, is operative for transferring a work carrier from a position in alignment with station S6 to a position in alignment with station S7. When the elevator chassis is in the fully raised position, the torque arms are operative to transfer both a work carrier and a work rack suspended therefrom around the arcuate end portions of the conveying machine. When the elevator chassis is in the fully lowered position, the torque arms are operative for transferring just the work carriers, devoid of the work racks which remain supported on the saddles at the respective treating stations, and wherein each work carrier is advanced to a position in which its engaging arms 152 (FIGURE 2) are disposed in vertical alignment below the engaging members 108 on the work racks. It is conventional in the operation of the machine to retract the transfer arms during the ascending and descending movement of the elevator chassis in order that when the elevator chassis attains its appropriate raised or lowered position, the arms are in position preparatory for the next operating movement.

The transfer mechanism employed for advancing the work carriers from station S14 to station S6 along the left-hand side of the machine, as viewed in FIGURE 2, will now be described in detail, with particular reference to FIGURES 10-15, inclusive. As best seen in FIGURES 10 and 11, a transfer mechanism 178 is mounted within the box framework 118 and extends longitudinally of the rails 114 thereon. The transfer mechanism 178 is operative to effect a transfer of a work carrier through an increment corresponding to station S4 (FIGURE 1), to either of stations S1 or S2, and thereafter to a point above the forward partition of treating receptacle 30. The transfer mechanism 178 comprises a continuous flexible element, such as a roller chain 180, which is trained around a drive sprocket 182 at one end, and a driven or idler sprocket 184 at the other end thereof. The drive sprocket 182 is mounted on a line shaft 186, which in turn is coupled to the output shaft of a speed reducer 188 having its input shaft coupled to a drive motor 190.

Figure 15:
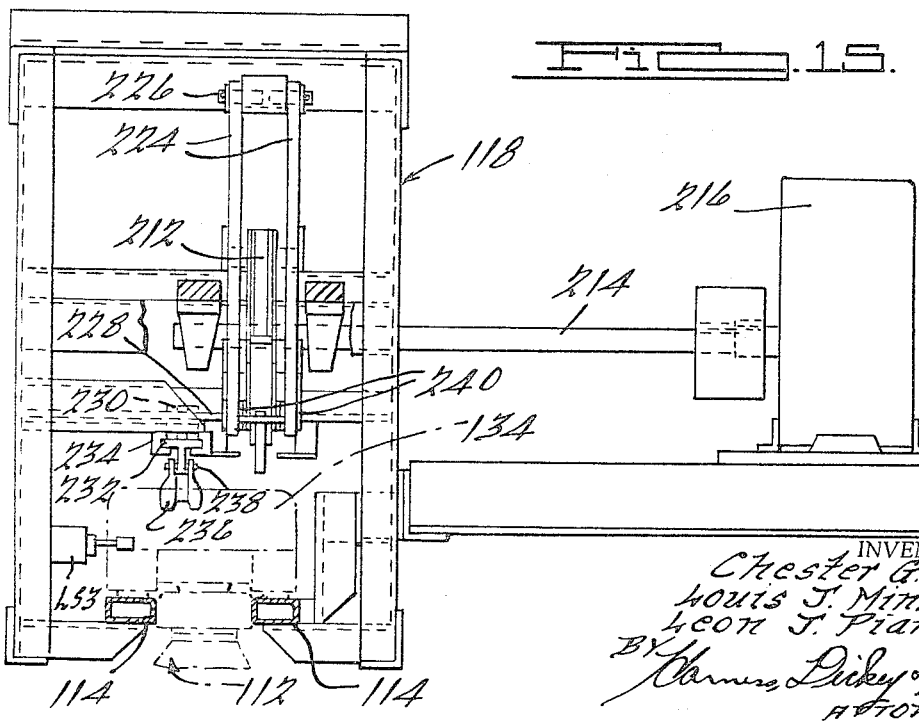
FIGURE 15 is an end elevational view of the mechanism as shown in FIGURE 14.

The upper flight of the roller chain 180 is guidably supported in a longitudinally extending channel guide 192, while the lower flight of the roller chain is guidably supported between a pair of opposed U-shaped channel guide members 194, as best seen, for example, in FIGURE 15. In order to provide guidance and support of the roller chain 180 during its travel between the drive and driven sprockets, suitable guide rollers 196, as best seen in FIGURES 12 and 13, are affixed at spaced intervals to elongated pins 198 which extend through and interconnect the individual links of the roller chain. The guide rollers 196 are adapted to be disposed in rolling bearing contact with the channel guide 192 during movement along the upper chain flight and to be disposed between the U-shaped channel guide members 194, as illustrated in FIGURE 13, during the travel of the roller chain through its lower flight. The coaction between the guide rollers 196 and the confining surfaces of the channel guide members 194 prevents inadvertent vertical or lateral movement of the roller chain relative to the longitudinal path of travel of the work carriers movably mounted on the supporting rails therebelow.

A pusher bracket 200 is affixed to the roller chain as best seen in FIGURES 12 and 13, by means of a pair of side clips 202 securely fastened to and overlying the side surfaces of the pusher bracket and having the upper ends thereof affixed to the pins retaining the roller links together. As will be noted in FIGURE 12, a plurality of guide rollers 196 are mounted in relatively closely spaced intervals adjacent to the pusher bracket 200 to assure its appropriate positioning during its longitudinal travel along the lower flight of the roller chain. The pusher bracket 200 is formed with an upwardly directed cavity 204 defining a pair of flanges between which the cam-shaped pusher 140 is pivotally secured by means of a pin 206. The cam-shaped pusher 140 is adapted to be disposed in interlocking engagement in the arcuate cavity 138 of the work carrier, as best seen in FIGURE 18, which serves to interlock the work carrier with the transfer chain, preventing inadvertent movement thereof when the transfer mechanism is stationary. Movement of the work carrier rearwardly, or to the left, as viewed in FIGURE 18, is prevented by the coaction between the forward portion of the cam-shaped pusher 140 and the pusher bracket 200, whereas movement of the work carrier toward a more advanced position is prevented by the coaction between the rearward arcuate surface of the pusher 140 and the upper edge surface of the arcuate cavity 138.

The pivoting movement of the pusher 140 about the pin 206 enables it to pivot from a normal disengaged position, as shown in phantom at the left-hand side in FIGURE 18, to an engaging position, as shown in solid lines in FIGURE 18, in response to the advancement of the roller chain, whereupon the lower arcuate surface of the pusher 140 contacts and moves upwardly along the upstanding edge of the longitudinal web 136 to the position shown in phantom in which the pusher 140 is in a substantially horizontal position. When the trailing edge of the pusher 140 passes beyond the trailing corner of the arcuate cavity, gravity effects a downward pivoting movement of the pusher to the position as shown in solid lines in FIGURE 18, wherein the work carrier is firmly engaged by the pusher. Disengagement of the pusher 140 from the arcuate cavity 138 in the work carrier is achieved during the rotary forward and upward movement of the pusher bracket 200, as shown in phantom at the right-hand side of FIGURE 18, as well as in FIGURE 14, effecting a release of the work carrier.

As will be noted in FIGURE 11, two pusher brackets 200 and two corresponding pivotally mounted pushers 140 thereon, are affixed to the roller chain 180 of the transfer mechanism 178 and are disposed 180° apart. The pusher disposed in the lower flight of the roller chain in accordance with the illustration shown in FIGURE 11 is adapted to transfer a work carrier with which it is engaged from a position above either station S1 or S2 (FIGURE 1) to a position beyond the partition of treating receptacle 30, while the second pusher positioned on the upper or return flight of the roller chain 180 is effective upon movement in a counterclockwise direction to engage and transfer a work carrier disposed at station S14 to a position in alignment above either station S1 or S2.

Further transfer of the work carriers from a point disposed above the partition of multiple treating station 30 to either stations S3, S4 or S5, is achieved by a second transfer mechanism 208 which also is disposed in the box framework 118 and is of a construction similar to that of the transfer mechanism 178 previously described. The transfer mechanism 208 is effective to transfer work carriers through the longitudinal increment designated as X2 in FIGURE 1. The balance of the transfer movement of the work carriers from above the output end partition of the multiple-station treating receptacle 30 to a position in alignment above treating station S6, corresponding to the transfer increment indicated at X3 in FIGURE 1, is achieved by an aligning mechanism 210, which is operable in response to the actuation of the transfer mechanism 208, and is best illustrated in FIGURES 14 and 15.

Referring now in particular to FIGURES 10–15, the transfer mechanism 208 comprises a drive sprocket 212, which is coupled to a drive shaft 214, which in turn is drivingly coupled to the output shaft of a speed reducer 216 driven by a motor 218. An idler sprocket 220 is rotatably mounted on the box frame 118, and around which a roller chain or other flexible element 222 is trained. The upper flight of the roller chain 222 is guided in channel guide 192, while the lower flight is supported by channel guide members 194 in a manner similar to that previously described in connection with transfer mechanism 178. As will be noted in FIGURES 10 and 11, the adjoining ends of the transfer mechanism 178 and 208 overlap slightly as is required to enable engagement of the pushers 140 on the roller chain 222 with a work carrier which has been advanced to a point at which the pusher 140 of the transfer mechanism 178 disengaged the work carrier.

The pusher brackets 200 and cam-shaped pushers 140 are of the type as illustrated in FIGURES 12 and 13 and are operative in a manner as previously described to effect intermittent advancement of the work carriers along the rails 114 through the increment indicated as X2 in FIGURE 1. In the exemplary arrangement as illustrated in FIGURE 11, the pusher 140 on the lower flight of the roller chain 222 is effective when the elevator chassis is in a lowered position to advance a work carrier to a position above the forward partition of single-station treating receptacle 32 (FIGURE 1) and effect a disengagement of the work carrier 112 as a result of its upward arcuate travel, as indicated in phantom in FIGURE 14. At the same time, the pusher 140 disposed on the upper flight of the roller chain, as shown in FIGURE 11, is effective to engage a work carrier which has been advanced by the transfer mechanism 178 to a position adjacent to the idler sprocket 220 and transfer that work carrier to a position above either stations S3, S4 or S5 (FIGURE 1).

In order to achieve appropriate alignment of a work carrier, such as the work carrier 112 shown in FIGURES 14 and 15, with the saddles disposed at station S6, the aligning transfer mechanism 210 is located at the output end of the transfer mechanism 208 for providing an additional transfer movement to the work carrier until it is substantially precisely aligned with station S6. The aligning transfer mechanism 210, as best seen in FIGURES 10–15, inclusive, comprises a pair of arcuate cam plates 224 pivotally connected at their upper ends by means of a pin 226, and disposed in spaced-apart substantially parallel alignment. The lower ends of the cam plates 224 are pivotally connected to a link arm 228, which in turn is pivotally connected to an ear 230 attached to a pusher bar 232 of a T-shaped cross section slidably disposed with the upper horizontal web thereof in guide shoes 234. A pusher 236 is pivotally connected to the lower depending web of the pusher bar 232 by means of a pin 238, and which pusher is adapted to engage the rearward surface of the transverse web 134 of the work carrier.

The pusher bar 232, and its pusher 236 thereon, is shown in solid lines in FIGURE 14 in the retracted position, by virtue of actuation of the cam mechanism of the aligning transfer mechanism 210, movement of the pusher bar to an advanced position, as shown in phantom, is effected and wherein the cam plates 224 are pivoted to the positions shown in phantom in FIGURE 14. Actuation of the aligning transfer mechanism 210 and corresponding reciprocation of the pusher bar 232 to and from a retracted position and an advanced position is achieved by a pair of cam rollers 240, as best seen in FIGURES 12 and 13, which are rotatably supported on the ends of pins 206 and which are adapted, respectively, to engage the rearward edge portion of the cam plates 224 in response to movement of the pusher bracket 200 around the periphery of the drive sprocket 212. The several moved positions of the cam rollers 240 and the pusher bracket 200 is illustrated in phantom in FIGURE 14. Accordingly, as the pusher bracket 200 commences to move upwardly as the roller chain 222 commences to pass around the forward periphery of the drive sprocket 212, a disengagement of the cam 140 from the arcuate cavity 138 occurs, whereby the work carrier is released from the transfer mechanism, and upon further movement of the roller chain, the cam plates 224 are moved from the position as shown in solid lines to the position as shown in phantom in FIGURE 14. In response to the arcuate movement of the cam plates, the link arm 228 effects a forward reciprocating movement of the pusher bar 232, whereupon the pusher 236 engages the work carrier and effects a further aligning advancement thereof to a position wherein it is disposed in appropriate alignment above station S6 (FIGURE 1). Continued further movement of the roller chain 222 results in a co-action between the cam rollers 240 and a pair of lugs 242 affixed to and projecting rearwardly from the upper portions of the cam plates 224 resulting in a retraction of the cam plates from the position as shown in phantom in FIGURE 14 to the position as shown in solid lines. The aligning pusher bar 232 is, accordingly, again returned to the retracted position preparatory to the next activation thereof.

It will be noted that the pusher 236 is pivoted so as to allow a work carrier, such as the carrier 112, as shown in FIGURE 14, to pass beneath the pusher, effecting a pivoting thereof upwardly into a clearance relationship, as shown in phantom, relative to the upper edge of the transverse web 134. As the work carrier is advanced beyond the pusher 236, the pusher again drops downwardly by the action of gravity to the position as shown in FIGURE 14 in solid lines. The work carrier, when disposed at station S6 (FIGURE 1), is positioned so as to be engaged by the transfer arm 156 positioned at the right-hand end of the machine as illustrated in FIGURE 10.

In the operation of the transfer mechanisms 178 and 208, the transfer mechanism 178 is first actuated and the transfer mechanism 208 is not actuated until a work carrier has been transferred to a position corresponding to the completion of the X1 increments shown in FIGURE 1, in which position the work carrier can be engaged by a pusher of the transfer mechanism 208. This is conveniently achieved by positioning a limit switch LS3, as shown for example in FIGURES 11 and 15, adjacent to the rail 114, which is adapted to be tripped in response to the advancement of a work carrier to a position adjacent thereto. Upon a tripping of limit switch LS3, the central control circuit is signaled, effecting thereby an energization of the drive motor 218 of the transfer mechanism 208, whereupon a work carrier disposed along the stations S3–S5 is advanced in an appropriate sequentially-phased operating sequence.

It will also be appreciated that the aligning transfer mechanism 210 employed between stations S5 and S6, constitutes a preferred embodiment in providing more precise alignment of a work carrier with the saddle disposed at station S6. Conventionally, however, the disposition of the drive sprocket 212 can be such whereupon the transfer mechanism 208 is effective to disengage from the work carrier at a point where it is disposed in precise vertical alignment with the work rack saddle supports.

The transfer of the work carriers along the opposite side of the machine will now be described with particular reference to FIGURES 2, 16 and 17. In accordance with the tank layout as illustrated in FIGURE 1, the transfer arm is operative to convey a work carrier from the output end of one row of aligned treating stations corresponding to station S6 to the input end of the other aligned series of treating stations corresponding to station S7. Advancement of the work carriers from station S7 to station S8, and thereafter from station S8 to station S9 through a total increment indicated as X6 in FIGURE 1, is achieved by a reciprocable-type pusher transfer mechanism 244 comprising a pusher bar 246, which is of a T-shaped cross section, and is guidably mounted in a guide shoe 248 attached to the box framework 120 of the elevator chassis. Reciprocation of the pusher bar 246 is achieved by a double-acting fluid-actuated transfer cylinder 248 having its blank end affixed to the elevator chassis and its piston rod 250 affixed to a bracket 252 connected to and extending upwardly from the pusher bar 246. Accordingly, reciprocation of the piston rod 250 effects a corresponding reciprocation of the pusher bar 246 and the pushers 254 pivotally mounted thereon to and from a retracted position as shown in solid lines in FIGURE 17, to a fully projected position. During the advancing movement of the pusher bar, the forward portions of the pushers 254 engage the rearward surface of the transverse web 134 of the work carriers 112, effecting an advancement thereof along the rails 114. When the pushers attain the fully advanced position, they are subsequently retracted and the pivoting movement of the pushers permits their retraction above and behind a next work carrier to be advanced. The ordinary pivoting movement of the pusher is illustrated in phantom in FIGURE 17. A suitable stop, indicated at 256, is formed on the pusher, which is adapted to engage the lower edge of the depending web of the pusher bar 246 to prevent a pivoting of the pusher during its advancing movement. The pusher 236 of the aligning transfer mechanism (FIGURE 14) is similarly constructed to provide for the same pivoting action.

The advanced position and the retracted position of the pusher bar 246 are signaled to the central control circuit by a limit switch LS4, which is adapted to be tripped by an actuator 258 when the pusher bar is in the fully retracted position, and by a limit switch LS5, which is adapted to be tripped by the actuator 258 when the pusher bar is in the fully advanced position. The disposition of the actuator 258 relative to the limit switches LS4 and LS5 is illustrated in FIGURE 17.

In accordance with the foregoing arrangement, the work carriers are sequentially advanced from station S7 to station S8, and thereafter to station S9 by the pusher mechanism 244, and from station S9 are advanced through either of the cell stations S10, S11 or S12 by a transfer mechanism 260, which is similar in operation and construction to transfer mechanisms 178 and 208 previously described. Suffice it to say, as shown in FIGURES 2 and 16, that the transfer mechanism 260 consists of a motor 262 drivingly coupled to a gear reducer 264 having its output shaft drivingly connected to a drive sprocket 266, around which a roller chain 268 extends and incorporates pusher brackets 200 and cam-shaped pushers 140 at 180° intervals therealong. The upper flight of the roller chain 268 is supported by channel guides 192, while the lower flight is supported by channel guide members 194 in a manner as previously described. Guide rollers 196 are affixed to pins of the roller chain 268, and are disposed with their peripheries in rolling bearing contact against the guide channels 192 and channel guide members 194. It will be apparent from the foregoing that the coordinated operation of the transfer mechanisms 178, 208 and 260, in combination with the pusher mechanism 244 and transfer arms 156, provides for continuity in the transfer of the workpieces in an intermittent sequentially-phased operation around the supporting rail 114.

The several operating components comprising the lift mechanisms and transfer mechanisms are operatively controlled in accordance with the hydraulic diagram illustrated in FIGURE 19. As shown in FIGURE 19, a reservoir tank 270 containing a suitable hydraulic fluid is connected by means of a conduit 272 to the inlet side of a hydraulic pump 274, which is drivingly coupled to a motor 276. Pressurized hydraulic fluid is discharged from the pump 274 through a pressure header 278, whereupon it is fed to the two torque box devices 160 for the transfer arms, each of the three motors 190, 218 and 264 for the three transfer mechanisms, the lift cylinder 74, and the transfer cylinder 248, through suitable branch pipes having solenoid-actuated valves therein. The solenoid-actuated valves are electrically connected to the central control panel, indicated at 280, which is operative to appropriately open and close the valve to achieve the desired operating sequence. The hydraulic fluid discharged from the several operating components is returned to the hydraulic reservoir by means of a return header 282. The several limit switches, such as the limit switches LS1A, LS1B, LS2A, LS2B, for signaling the disposition of the two transfer arms; the limit switch LS3 for signaling the presence of a work carrier at the input end of the transfer mechanism 208; retract limit switch LS4 and advance position limit switch LS5 for the pusher mechanism 244; and elevator chassis up-position limit switch LS6 and down-position limit switch LS7 (FIGURE 3) for signaling the position of the elevator chassis are all electrically connected to the control panel 280 for coordinating the sequential operation of the several components.

In addition to the foregoing, in order to achieve an appropriate cell-type operation in multiple-station treating receptacles 30 and 42, as well as at the load and unload stations S1 and S2, station limit switches are provided which are adapted to be selectively actuated, and in response to a tripping thereof by a work carrier, are operative to de-energize the appropriate transfer mechanism to effect a stoppage of the work carrier at that specific station. For this purpose, station limit switches LSS1, LSS2, LSS3, LSS4, LSS5, LSS10, LSS11, LSS12 are provided at stations S1, S2, S3, S4, S5, S10, S11 and S12, respectively, as indicated in FIGURE 1. Each of the station limit switches are interconnected with the central control panel 280 as diagrammatically illustrated in FIGURE 21, and are sequentially energized by a suitable sequencing drum 284 illustrated in FIGURE 20. As shown in FIGURE 20, the sequencing drum 284 is drivingly coupled to a motor 286 which is supplied with energy from a motor controller 288 each time limit switch LS7 is actuated. Limit switch LS7 corresponds to the chassis down-position limit switch and is closed each time the elevator chassis attains the fully lowered position.

In accordance with the exemplary embodiment illustrated in FIGURES 20 and 21, the closing of limit switch LS7 causes the motor controller 288 to effect an energization of the motor 286 so as to achieve an indexing of the sequencing drum 284 through an angularity of 60°. The sequencing drum, as schematically illustrated in FIGURES 20 and 21, is formed with a contact ring 290, which is disposed in continuous electrical contact with conductor 292 connected to the central control panel 280. The contact ring 290 is in turn electrically connected to contact 294 which is indexed through 60° increments, and accordingly, is sequentially placed in contact with either contacts C1 or C2 which are electrically connected, respectively, to station limit switches LSS1 and LSS2. Similarly, a contact ring 296, which is disposed in continuous electrical contact with a conductor 298 and contact 300. The incremental rotation of the sequencing drum 284 in a counterclockwise direction, as viewed in FIGURE 21, causes successive contact to be made between contact 300 and contacts C3, C4 and C5 disposed in equal arcuate increments therearound, which in turn is effective to sequentially energize station limit switches LSS3, LSS4 or LSS5.

In a similar manner, a contact ring 302 is disposed in continuous electrical contact with a conductor 304, which is electrically connected to the cycle control panel 280. The contact ring 302 is continuously connected to contact 306 on the periphery of the sequencing drum, which, in response to the indexing thereof, is disposed in sequential electrical contact with contacts C10, C11 and C12, effecting selective energization of station limit switches LSS10, LSS11 and LSS12, respectively. It will be apparent from the foregoing arrangement that the sequencing drum, which is indexed each time the elevator chassis attains the fully lowered position, is effective to place one station limit switch of each of the multiple-station treating receptacles in the control circuit such that activation of that station limit switch is effective to stop the movement of the respective transfer mechanism, whereby a work carrier is stopped at that station. The remaining limit switches at the other stations, by virtue of this arrangement, are deactivated whereupon a tripping of such station limit switches by the work carriers during their advancing movement has no effect on the operation of the control system. It will be appreciated that alternative suitable sequencing devices can be satisfactorily employed for selectively energizing the appropriate station limit switch or sensing device of each of the cell operating sections of the conveying machine.

In order to further illustrate the structural features of the conveying machine comprising the present invention, and the coordination of the several operating components thereof to provide for a preselected sequential transfer of the work carriers to the treating stations, the following operating description is provided, with particular reference to the schematic sequence views comprising FIGURES 22–28 inclusive. As will be noted, FIGURES 22–28 depict schematically the fourteen individual treating stations, as illustrated in FIGURE 1 of the drawings, and the work racks for the purposes of clarity, have been numbered W1–W14, respectively, at stations S1–S14 inclusive. In the specific condition as shown in FIGURE 22, the elevator chassis is in a raised position wherein work racks W1, W3, W6, W7, W8, W9, W10, W13 and W14 have been lifted to an elevated position above the treating station preparatory to the next advancing movement of the several transfer mechanisms. Upon the attainment of the fully elevated position as signaled by the chassis up-position limit switch LS6 (FIGURE 3), transfer mechanisms 178, 244, 260 and the two transfer arms are energized in a manner as previously described, whereupon the work racks and work carriers are transferred toward the right, as indicated by the arrows in FIGURE 22, to the position formerly occupied by the immediately preceding elevated work carrier. The work rack W1 is advanced to a position intermediate stations S2 and S3, at which point the work carrier trips limit switch LS3 (FIGURE 15), whereupon transfer mechanism 208 is energized effecting further transfer of work rack W1 to a position above station S3.

Each of the transfer mechanisms above the multiple cell stations is selectively controlled so as to halt the travel of the work carrier and work rack thereon as established by the position of the sequencing drum which is in the position depicted in FIGURE 21 such that the station limit switches at stations S1, S3 and S10 are activated. Upon attainment and tripping of each of the aforementioned station limit switches, the elevator chassis is lowered, and the fully lowered position is signaled by a tripping of down-position limit switch LS7 (FIGURE 20). In response to the tripping of down-position chassis limit switch LS7, the sequencing drum (FIGURE 20) is indexed to the next position, wherein the station limit switches LSS2, LSS4 and LSS11 at stations S2, S4 and S11, respectively, are activated.

Each of the transfer mechanisms is again actuated whereupon the work racks deposited in the positions as shown in FIGURE 23 remain supported on the saddles at the respective station, while the specific work carriers are advanced in the direction of the arrows from the positions as shown in FIGURE 23 to the positions below the work racks to be lifted on the next elevating movement of the chassis. FIGURE 24 depicts the situation wherein the work carriers have completed their advancing movement after which the elevator chassis is again raised effecting a withdrawal of work racks W2, W4, W3, W6, W7, W8, W11, W10 and W13 from stations S2, S4, S6, S7, S8, S9, S11, S13 and S14, respectively. When the elevator chassis attains the fully raised position, as signaled by chassis up-position limit switch LS6 (FIGURE 3), each of the transfer mechanisms is again actuated effecting an advancement of the work racks in the direction of the arrows as viewed in FIGURE 24 to the position formerly occupied by the immediately preceding work carrier, after which the elevator chassis is again lowered depositing the carrier thus transferred into the stations just vacated as shown in FIGURE 25.

Upon a tripping of chassis down-position limit switch LS7, the sequencing drum 284 (FIGURE 20) is again indexed whereupon the respective rotary contacts on the drum are disposed in electrical contact such to place station limit switches LSS1, LSS5 and LSS12 at stations S1, S5 and S12, respectively, in the control circuit, assuring that the work racks at each of those stations will next be withdrawn from the treating solutions, and thereafter will be replaced by a work rack which is to undergo the same cycle. Accordingly, the work carriers are advanced from the positions as shown in solid lines in FIGURE 25, in the direction of the arrows, so as to become disposed in vertically aligned relationship beneath the work racks at stations S1, S5, S6, S7, S8, S9, S12, S13 and S14, whereupon, when the elevator chassis is raised, the work racks at those stations are moved to the elevated position as shown in FIGURE 26. Upon attaining the fully elevated position, the work racks are advanced to the right in the direction of the arrows, as shown in FIGURE 26, to the position previously occupied by the preceding work racks, after which the elevator chassis is again lowered such that the work racks and carriers assume the down position, as illustrated in FIGURE 27. Upon the tripping of chassis down-position limit switch LS7 (FIGURE 20), the sequencing drum is again indexed, whereupon the station limit switches LSS2, LSS3 and LSS10 at stations S2, S3 and S10, respectively, are activated, assuring that the work racks at these stations will next be removed by virtue of an advancement of the work carriers from the positions as shown in FIGURE 27 to positions beneath those work racks as illustrated in FIGURE 28, whereupon the next ascending movement of the elevator chassis effects an extraction thereof.

It will be noted that during the course of the operating sequence as illustrated in FIGURES 22–28, each work rack at cell stations S1 and S2; at cell stations S3, S4 and S5, and at cell stations S10, S11 and S12 is sequentially removed and replaced by a new work rack. The work rack sequence at load and unload stations S1 and S2 alternates, while the sequence at the other two three-station cell groupings progressively moves down the tank until the last station is attained, after which a repeat cycle is initiated. The work racks at the remaining single-station receptacles are sequentially transferred in series and no selectivity or cell operating cycle is performed at such stations.

It will be apparent from the foregoing that a selective cell-type operation can be achieved at one or more sections of the machine encompassing two or more cell stations within each grouping, and which operation can readily be coordinated with the operating sequence of the remainder of the machine. It will be further apparent that the foregoing operating cycle can be simply and positively achieved with only minimal controls to assure proper sequentially-phased operation of the several machine components.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A conveying machine for conveying work racks through a series of treating stations comprising a frame, an elevator chassis mounted on said frame, rail means on said chassis extending along a series of treating stations including at least one section of cell stations, work rack supporting means at each of the stations, a plurality of work carriers movably mounted on said rail means, engaging means on each said carrier for engaging and suspending a work rack therefrom, means for moving said chassis to and from a raised position and a lowered position, said engaging means on said work carriers when said chassis is in said lowered position disposed below and in horizontal clearance relationship relative to the work racks disposed on said supporting means, transfer means for intermittently advancing said carriers and work racks suspended therefrom along said rail means when said chassis is in said raised position and said carriers when said chassis is in said lowered position, and control means operable for controlling said transfer means for positioning said carriers when in said lowered position in alignment beneath work racks on said supporting means and effecting a withdrawal thereof in response to the ascending movement of said chassis and for depositing different work racks at the treating stations thus vacated, said control means further including sensing means at each of said cell stations and operable for controlling the transfer of work carriers to and from said cell stations in a preselected ordered sequence.

2. The conveying machine as defined in claim 1, wherein said rail means extend in a continuous loop configuration around said treating stations whereby the work racks and carriers are transferred in a continuous closed circuit.

3. The conveying machine as defined in claim 1, wherein said rail means comprises a pair of spaced-apart rails and wherein said work carriers are movably and guidably mounted between said rails.

4. The conveying machine as defined in claim 3, wherein each of said work carriers includes means for slidably supporting said carrier on said rails and roller means disposed with the periphery thereof adapted to be positioned in rolling bearing contact against the opposed edges of said rails.

5. The conveying machine as defined in claim 1, wherein at least a portion of said transfer means comprises a reciprocable pusher bar having a plurality of pushers disposed at longitudinally spaced intervals therealong for engaging and advancing the work carriers in response to the advancing reciprocating movement of said pusher bar.

6. The conveying machine as defined in claim 1, wherein at least a portion of said transfer means comprises a transfer device including a continuous flexible element extending around a pair of spaced-apart rotatable members mounted on said chassis and wherein one flight of said flexible element extends longitudinally of said rail means, and a pusher member affixed to said flexible element and adapted to engage and advance a work carrier along said rail means in response to movement of said flexible element.

7. The conveying machine as defined in claim 6, wherein said pusher member includes an arcuately-shaped and pivotally mounted pusher adapted to be disposed in engaging relationship with a correspondingly shaped arcuate cavity in said work carrier.

8. The conveying machine as defined in claim 6, wherein at least a portion of said transfer means comprises a first said transfer device and a second said transfer device disposed in longitudinally spaced relationship along said rail means with the adjacent ends of each said transfer device disposed in overlapping relationship for a portion of the transfer movement thereof.

9. The conveying machine as defined in claim 8, wherein sensing means are provided for signaling the advance of a work carrier by said first transfer device to a point adjacent to the overlapping portion of said second transfer device and for effecting energization of said second transfer device in response to the arrival of a work carrier therealong.

10. The conveying machine as defined in claim 6, wherein supplementary transfer means are provided at the output end of said transfer device including a reciprocable pusher bar, coacting means on said flexible element, and cam means drivingly connected to said pusher bar and disposed in operative relationship relative to said coacting means on said flexible element for effecting a reciprocation of said pusher bar to and from an advanced position to a retracted position in response to the movement of said flexible element and said coacting means thereon relative to said cam means.

References Cited

UNITED STATES PATENTS

| | | | |
|---|---|---|---|
| 2,826,288 | 3/1958 | Giaier | 214—89 XR |
| 2,902,181 | 9/1959 | Hauck | 214—89 |
| 3,301,418 | 1/1967 | Davis | 214—89 |
| 3,307,720 | 3/1967 | Davis et al. | 214—89 |

GERALD M. FORLENZA, *Primary Examiner.*

A. J. MAKAY, *Examiner.*